US008583845B2

(12) United States Patent  
Takeuchi et al.

(10) Patent No.: US 8,583,845 B2  
(45) Date of Patent: Nov. 12, 2013

(54) MULTI-PROCESSOR SYSTEM AND CONTROLLING METHOD THEREOF

(75) Inventors: Toshiki Takeuchi, Tokyo (JP); Hiroyuki Igura, Tokyo (JP)

(73) Assignee: NEC Corporation, Tokyo (JP)

( * ) Notice: Subject to any disclaimer, the term of this patent is extended or adjusted under 35 U.S.C. 154(b) by 269 days.

(21) Appl. No.: 13/054,906

(22) PCT Filed: Apr. 22, 2009

(86) PCT No.: PCT/JP2009/001827  
§ 371 (c)(1),  
(2), (4) Date: Jan. 19, 2011

(87) PCT Pub. No.: WO2010/016169  
PCT Pub. Date: Feb. 11, 2010

(65) Prior Publication Data  
US 2011/0125948 A1   May 26, 2011

(30) Foreign Application Priority Data  
Aug. 7, 2008  (JP) ................. 2008-203768

(51) Int. Cl.  
*G06F 12/00* (2006.01)  
*G06F 13/14* (2006.01)  
*G06F 13/38* (2006.01)

(52) U.S. Cl.  
USPC .......................... 710/240; 710/241

(58) Field of Classification Search  
USPC ............................... 710/240–244  
See application file for complete search history.

(56) References Cited

U.S. PATENT DOCUMENTS

| | | | | |
|---|---|---|---|---|
| 4,774,625 A | * | 9/1988 | Yamanaka | 712/31 |
| 4,965,717 A | | 10/1990 | Cutts, Jr. et al. | |
| 5,321,818 A | * | 6/1994 | Wendling et al. | 710/110 |
| 5,428,811 A | * | 6/1995 | Hinton et al. | 712/23 |
| 5,452,452 A | * | 9/1995 | Gaetner et al. | 718/103 |
| 5,598,575 A | * | 1/1997 | Dent et al. | 710/28 |
| 5,767,866 A | * | 6/1998 | Chee et al. | 345/535 |
| 5,819,112 A | * | 10/1998 | Kusters | 710/36 |

(Continued)

FOREIGN PATENT DOCUMENTS

| | | | |
|---|---|---|---|
| JP | 01292539 A | * | 11/1989 |
| JP | 02048765 A | * | 2/1990 |

(Continued)

OTHER PUBLICATIONS

Melear, C., "Intelligent peripheral modules and applications performed by modular microcontrollers," Southcon/96. Conference Record , pp. 443,451, Jun. 25-27, 1996.*

(Continued)

*Primary Examiner* — Faisal M Zaman  
(74) *Attorney, Agent, or Firm* — Sughrue Mion, PLLC

(57) ABSTRACT

In order to control sub-processors in parallel without losing extensibility, an execution control circuit (30), which forms a multi-processor system (1), issues a process command (CMD) to each of sub-processors (20_1 to 20_3) based on a process sequence (SEQ) designated by a main processor (10), and acquires a process status (STS) which indicates an execution result of processing executed by each of the sub-processors (20_1 to 20_3) in accordance with the process command (CMD). An arbiter circuit (40) arbitrates transfer of the process command (CMD) and the process status (STS) between the execution control circuit (30) and each of the sub-processors (20_1 to 20_3).

13 Claims, 23 Drawing Sheets

(56) References Cited

U.S. PATENT DOCUMENTS

| | | | |
|---|---|---|---|
| 5,875,343 A * | 2/1999 | Binford et al. | 710/263 |
| 5,978,830 A * | 11/1999 | Nakaya et al. | 718/102 |
| 6,009,472 A * | 12/1999 | Boudou et al. | 709/232 |
| 6,243,793 B1 * | 6/2001 | Aucsmith et al. | 711/151 |
| 6,378,061 B1 * | 4/2002 | Carbine et al. | 712/200 |
| 6,513,082 B1 * | 1/2003 | Fischer et al. | 710/113 |
| 6,701,407 B1 | 3/2004 | Honjo et al. | |
| 6,754,281 B1 * | 6/2004 | Dujardin et al. | 375/260 |
| 6,760,820 B2 * | 7/2004 | Henson et al. | 711/151 |
| 7,305,537 B1 * | 12/2007 | Moore et al. | 711/167 |
| 7,995,043 B2 * | 8/2011 | Noorbakhsh et al. | 345/204 |
| 2002/0049822 A1 * | 4/2002 | Burkhardt et al. | 709/208 |
| 2002/0062414 A1 * | 5/2002 | Hofmann et al. | 710/110 |
| 2002/0120799 A1 * | 8/2002 | Shah | 710/241 |
| 2004/0181638 A1 * | 9/2004 | Linehan et al. | 711/156 |
| 2004/0202174 A1 * | 10/2004 | Kim et al. | 370/395.1 |
| 2006/0029104 A1 * | 2/2006 | Jungck | 370/498 |
| 2006/0224807 A1 * | 10/2006 | Ishikawa | 710/241 |
| 2007/0174529 A1 * | 7/2007 | Rodriguez et al. | 710/240 |
| 2007/0294511 A1 * | 12/2007 | Ramchandran et al. | 712/34 |
| 2008/0307136 A1 * | 12/2008 | Haug et al. | 710/110 |
| 2010/0049268 A1 * | 2/2010 | Martins | 607/9 |
| 2011/0191527 A1 * | 8/2011 | Fukuda | 711/103 |

FOREIGN PATENT DOCUMENTS

| | | | | |
|---|---|---|---|---|
| JP | 2-101558 A | | 4/1990 | |
| JP | 2-202637 A | | 8/1990 | |
| JP | 02220138 A | * | 9/1990 | |
| JP | 5-012219 A | | 1/1993 | |
| JP | 5-35661 A | | 2/1993 | |
| JP | 06019836 A | * | 1/1994 | |
| JP | 07319806 A | * | 12/1995 | |
| JP | 9-218859 A | | 8/1997 | |
| JP | 10171752 A | * | 6/1998 | |
| JP | 2000-40076 A | | 2/2000 | |
| JP | 2001-167069 A | | 6/2001 | |
| JP | 2002-207711 A | | 7/2002 | |
| JP | 2003-036240 A | | 2/2003 | |
| JP | 2003-208412 A | | 7/2003 | |
| JP | 2007-219816 A | | 8/2007 | |
| JP | 2007-219925 A | | 8/2007 | |
| JP | 2008191074 A | * | 8/2008 | |

OTHER PUBLICATIONS

Cantoni, A., "A technique for interrupt distribution in a multiprocessor system," Software & Microsystems, vol. 1, No. 6, pp. 153,159, Oct. 1982.*

IEEE Standard FASTBUS Modular High-Speed Data Acquisition and Control System and IEEE FASTBUS Standard Routines, IEEE Std 960-1989, Std 1177-1989, pp. 0_5,, 1990.*

Singh, A.K.; Shrivastava, A.; Tomar, G.S., "Design and Implementation of High Performance AHB Reconfigurable Arbiter for Onchip Bus Architecture," Communication Systems and Network Technologies (CSNT), 2011 International Conference on, pp. 455,459, Jun. 3-5, 2011.*

Communication, dated May 14, 2013, issued by the Japanese Patent Office in counterpart Japanese Patent Application No. 2010-523720.

* cited by examiner

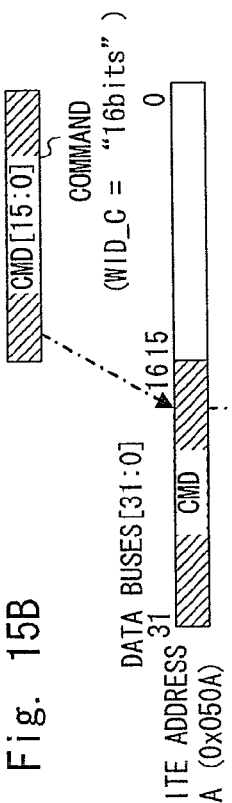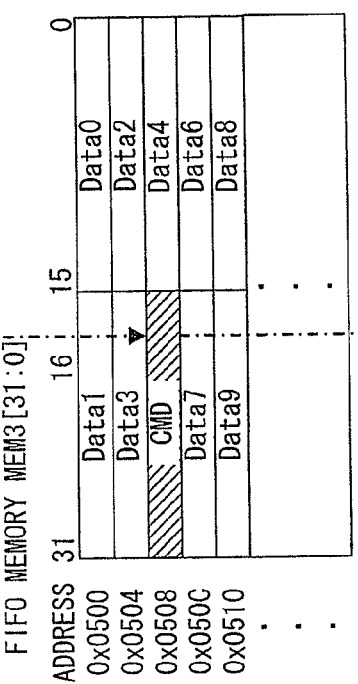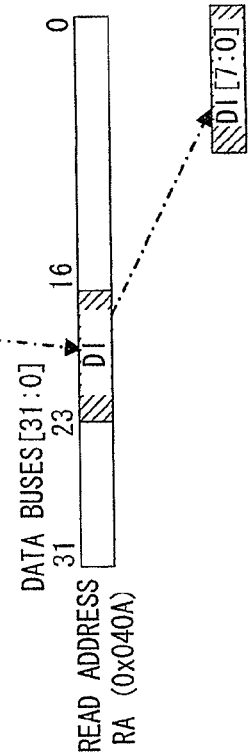
Fig. 15A
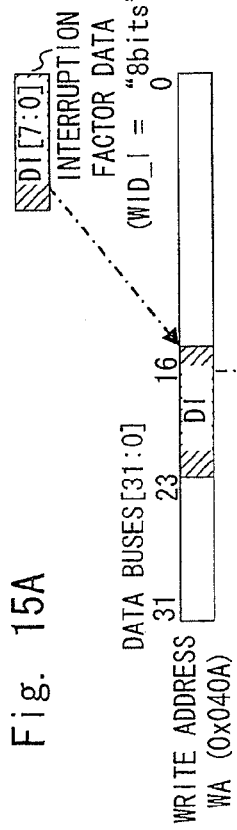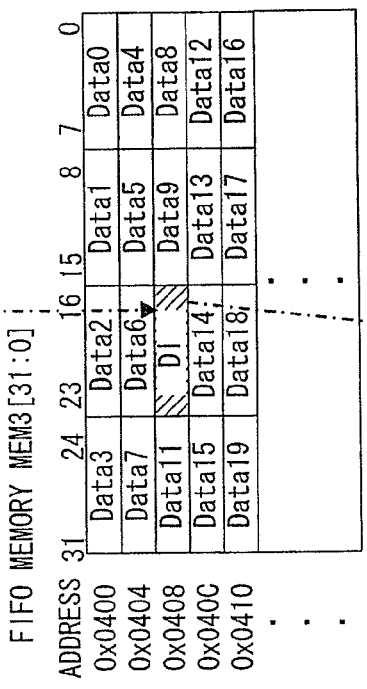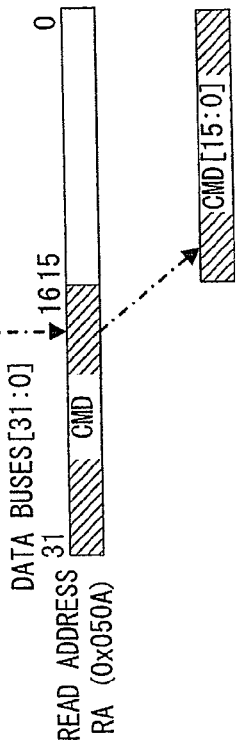
Fig. 15B

MULTI-PROCESSOR SYSTEM AND CONTROLLING METHOD THEREOF

CROSS REFERENCE TO RELATED APPLICATIONS

This application is a National Stage of International Application No. PCT/JP2009/001827 filed Apr. 22, 2009, claiming priority based on Japanese Patent Application No. 2008-203768 filed Aug. 7, 2008, the contents of all of which are incorporated herein by reference in their entirety.

TECHNICAL FIELD

The present invention relates to a multi-processor system and a controlling method thereof, and particularly to a multi-processor system which controls a plurality of sub-processors in parallel and a controlling method thereof.

BACKGROUND ART

A multi-processor system is typically classified into the one of type SMP (Symmetric Multi-Processor) in which functions are homogeneously and symmetrically allocated to respective sub-processors, or into the one of type AMP (Asymmetric Multi-Processor) in which the functions are heterogeneously and asymmetrically allocated to the respective sub-processors.

In the multi-processor system of type AMP, a method where a main processor directly controls a plurality of other sub-processors has been traditionally used. This method is the one where the main processor, which manages the whole system to execute principal processing, also performs activation control of each of the sub-processors functionally distributed. The control over each sub-processor is performed by use of a system bus to which the main processor has the right of access. Each sub-processor inputs an interrupt signal to the main processor, and then the main processor checks the status of each sub-processor by using the system bus, whereby a process completion notification from each sub-processor is performed. Thus, it is possible to aggregate management of the status of the whole system and management of the status of each sub-processor in one place. Therefore, there are advantages of facilitating consideration and implementation of a control sequence in the whole multi-processor system, and of enhancing observability upon debug.

However, in the above-mentioned method, there is a problem that processing in the whole system LSI (Large Scale Integration) collapses due to the growing scale and complexity of the system LSI in recent years. The major factor is that, in the traditional architecture where the main processor performs the whole control, processing load concentrates in the main processor to be congested due to an increase in the number of sub-processors mounted in the system LSI.

There have been already proposed first to third related art for addressing this problem. Hereinafter, the first to third related art will be sequentially described.

FIRST RELATED ART

Patent Literature 1 discloses a multi-processor system including an execution control device which parallelly controls sub-processors as substitute for a main processor. The execution control device generally makes two or more sub-processors operate in a pipelined parallel manner, thereby enhancing load distribution from the main processor and availability of each sub-processor.

Specifically, as shown in FIG. 22, this multi-processor includes a master processor 1110 operating as the main processor, a slave processor 1120 and a DMA (Direct Memory Access) controller 1130 operating as the sub-processors, a local memory 1121 used as a work area for the slave processor 1120, a main memory 1140, and a command execution control device 1150. In this example, the DMA controller 1130 controls transfer of data between the local memory 1121 and the main memory 1140. Note that four banks #0 to #3 are allocated to the local memory 1121.

Further, the command execution control device 1150 includes a communication memory 1151 in which a plurality of commands used by the master processor 1110 are preliminarily stored, a command queue 1152 which accepts series of commands from the master processor 1110, an execution controller 1160 which makes the slave processor 1120 and the DMA controller 1130 parallelly execute each command in the series of commands accepted by the command queue 1152, a completion acceptor 1153 which receives completion notification signals indicating execution completion of the command from the slave processor 1120 and the DMA controller 1130, and a completion notifier 1170 which transmits the completion notification signal in response to a request from the master processor 1110.

Further, the execution controller 1160 includes next command ID holders 1161 and 1162, and a bank table 1163. The next command ID holders 1161 and 1162 are memory areas for storing IDs of commands which the execution controller 1160 must make the slave processor 1120 and the DMA controller 1130 execute next time. Further, the bank table 1163 manages virtual bank number used upon instructing access to the local memory 1121 by the command, in association with physical bank number for actually identifying the bank in the local memory 1121.

Furthermore, the completion notifier 1170 is provided with a completion table 1171 for managing whether or not the execution of each command has been completed.

SECOND RELATED ART

While not shown in drawings, there has been generally known a technique of implementing a status register in order to check the status of a different sub-processor. Specifically, when one sub-processor writes change in its own status in the status register in a case of desiring to notify the status change, an interrupt signal is generated for another sub-processor which is the notification destination. The sub-processor, which has received the interrupt signal, acquires the status change from the status register.

THIRD RELATED ART

Patent Literature 2 discloses a multi-processor system where communication between two processors is conducted by use of a FIFO (First In First Out) buffer. Specifically, as shown in FIG. 23, this multi-processor system includes a FIFO buffer 2103 used for communication between processors 2101 and 2102, and an access control circuit 2104 which controls access to the FIFO buffer. Further, the access control circuit 2104 is provided with a capacity set register 2105 for setting the number of stages of data in the FIFO buffer 2103. In accordance with the setting value in the register 2105, distribution of capacity of the FIFO buffer 2103 is performed for each of the processors 2101 and 2102. Furthermore, access from the respective processors 2101 and 2102 to the FIFO buffer 2103 is controlled by respectively using write pointers 2106 and 2108, and read pointers 2107 and 2109.

CITATION LIST

Patent Literature

Patent Literature 1

Japanese Unexamined Patent Application Publication No. 2003-208412

Patent Literature 2

Japanese Unexamined Patent Application Publication No. 2003-036240

SUMMARY OF INVENTION

Technical Problem

However, in the above-mentioned first to third related art, there is a problem of being low in extensibility of the multi-processor system. This is because circuit configuration depends on the number of sub-processors.

Specifically, in the execution control device of the above-mentioned first related art, internal circuit configuration depends on the number of sub-processors connected thereto for the reason that the completion notification signals are input from the respective sub-processors in parallel or the like. As described above, in the recent system LSI, a plurality of sub-processors are generally integrated into a single chip and it is required to extend the system (in other words, to increase the number of sub-processors) in a short period. However, it is necessary for the circuit configuration of the execution control device to be changed for every extension of the system.

Further, in the above-mentioned second related art, the number of required status registers changes depending on the number of sub-processors, the number of statuses (the number of types of status changes), and the like. Therefore, it is still necessary for circuit configuration to be changed for every extension of the system. In order to address this, measures to preliminarily implement a lot of status registers may be considered. However, cost of development increases in this case.

Furthermore, in the above-mentioned third related art, it is required to increase the number of FIFOs and communication paths between processors, depending on the number of processors. After all, the change of circuit configuration accrues for every extension of the system.

Accordingly, the present invention aims to provide a multi-processor system and a controlling method thereof, which can control sub-processors in parallel without losing extensibility.

Solution to Problem

In order to achieve the above-mentioned aim, a multi-processor system according to one exemplary aspect of the present invention includes: at least one main processor; a plurality of sub-processors; an execution control means for issuing a process command to each of the sub-processors based on a process sequence designated by the main processor, and acquiring an execution result of processing executed by each of the sub-processors in accordance with the process command; and an arbiter means for arbitrating transfer of the process command and the execution result between the execution control means and each of the sub-processors.

Further, a controlling method of a multi-processor system according to one exemplary aspect of the present invention provides a method of controlling a multi-processor system that includes at least one main processor and a plurality of sub-processors. This method includes: issuing a process command to each of the sub-processors based on a process sequence designated by the main processor, and acquiring an execution result of processing executed by each of the sub-processors in accordance with the process command; and arbitrating transfer of the process command to each of the sub-processors, and transfer of the execution result to the main processor.

Advantageous Effects of Invention

According to the present invention, an interface part which depends on the number of sub-processors is absorbed in an arbiter circuit (or processing equivalent thereto). Therefore, even when the number of sub-processors increases or decreases, no change occurs in configuration of an execution control circuit (or processing equivalent thereto). Accordingly, it is possible to greatly improve extensibility of a multi-processor system compared with the above-mentioned first to third related art. Further, the sub-processors are controlled in parallel. Therefore, it is possible to reduce processing load of a main processor, and to enhance availability of the sub-processors.

BRIEF DESCRIPTION OF DRAWINGS

FIG. 15A is a diagram showing one example of a process to convert data executed by the FIFO memory controller which is used in the second exemplary embodiment of the multi-processor system according to the present invention;

FIG. 15B is a diagram showing another example of the process to convert the data executed by the FIFO memory controller which is used in the second exemplary embodiment of the multi-processor system according to the present invention;

DESCRIPTION OF EMBODIMENTS

Hereinafter, first to fifth exemplary embodiments of a multi-processor system according to the present invention will be described with reference to FIGS. 1 to 14, 15A and 15B, and 16 to 21. Note that the same signs are assigned to the same elements throughout the drawings, and their duplicated explanation is omitted as appropriate for clarifying the description.

Firstly, a configuration example and an operation example, which are common to multi-processor systems according to the first to fifth exemplary embodiments, are schematically described with reference to FIGS. 1 to 3.

Figure 1:
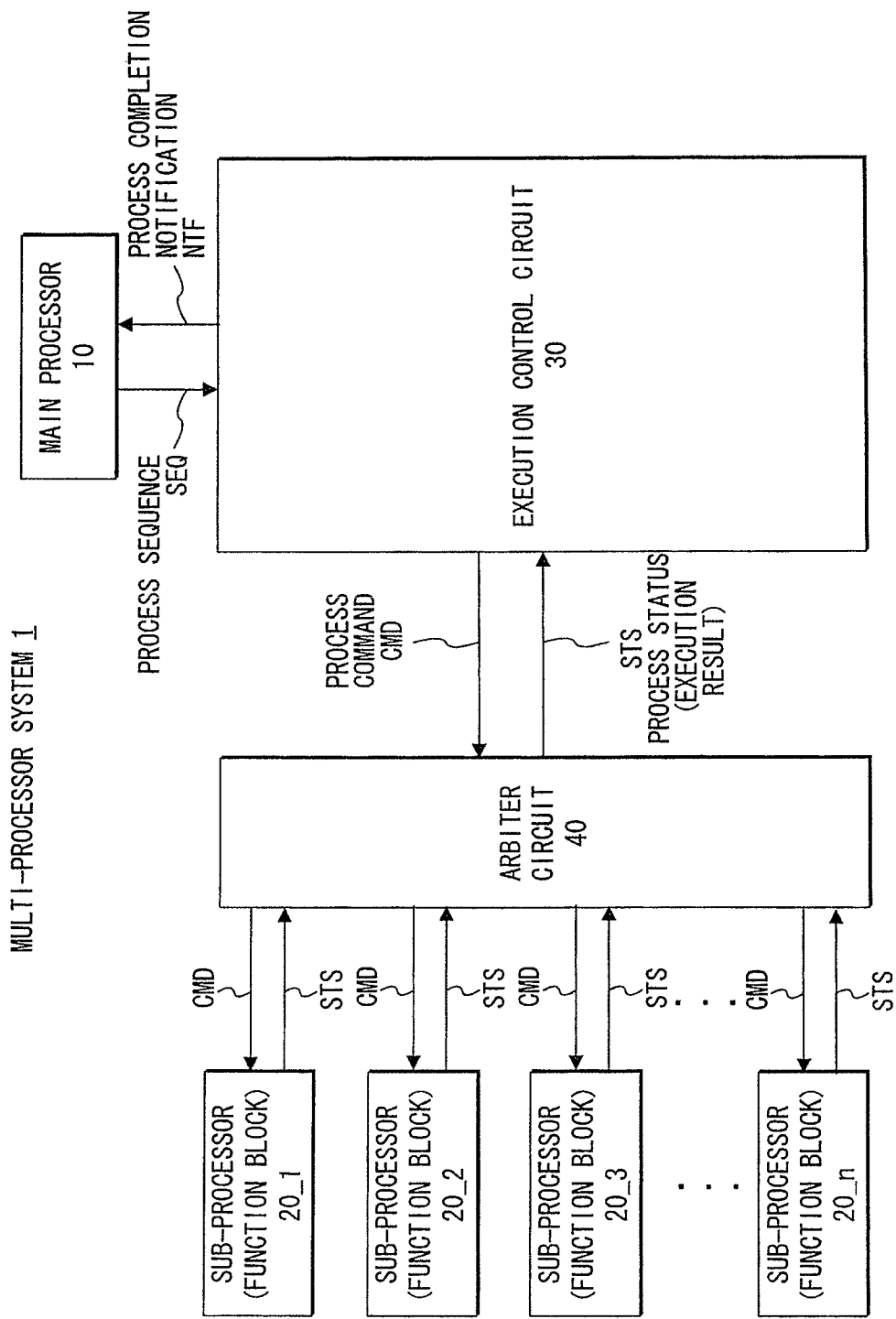
FIG. 1 is a block diagram showing a configuration example which is common to exemplary embodiments of a multi-processor system according to the present invention.

As shown in FIG. 1, a multi-processor system 1 includes a main processor (hereinafter, occasionally abbreviated as MP) 10, "n" units (n is an integer number of two or more) of sub-processors (function blocks) 20_1 to 20_n, an execution control circuit 30 which issues a process command CMD to each of the sub-processors 20_1 to 20_n based on a process sequence SEQ designated by the main processor 10 and acquires a process status STS indicating an execution result of processing executed by each of the sub-processors 20_1 to 20_n in accordance with the process command CMD; and an arbiter circuit 40 which arbitrates transfer of the process command CMD and the process status STS between the execution control circuit 30 and each of the sub-processors 20_1 to 20_n. Further, the execution control circuit 20 transmits a process completion notification NTF to the main processor 10 when all processes based on the process sequence SEQ are completed.

Note that to the sub-processors 20_1 to 20_n, the same function or mutually different functions may be allocated. Namely, the multi-processor system 1 can operate as any one of type SMP and type AMP.

The above-mentioned process sequence SEQ is a group of structures where a structure in which processing to be executed by each sub-processor is defined, and a structure in which data to be obtained by the processing is defined are linked with each other. FIG. 2 shows a specific example of the process sequence SEQ. In the example shown in FIG. 2, the process sequence SEQ indicates the following (1) to (4):

(1) Data D0 and D1 are obtained by a process PA as output data;

(2) A process PB treats the data D0 as input data, and makes data D2 as output data;

(3) A process PC treats the data D1 as input data, and makes data D3 as output data; and (4) A process PD treats the data D2 and D3 obtained by the processes PA and PB as input data.

In this case, the execution control circuit 30 receives a process status STS indicating completion of outputting the data D0 from a sub-processor which has executed the process PA, and then issues a process command CMD to start the process PB. The execution control circuit 30 receives a process status STS indicating completion of outputting the data D1, and then issues a process command CMD to start the process PC. Further, the execution control circuit 30 receives process statuses STS indicating completion of outputting the data D2 and D3 from two units of sub-processors which have executed the process PB and PC, and then issues a process command CMD to start the process PD. Note that although the illustration is omitted, commands CMD to start the respective processes PA to PD are defined in the structure in the process sequence SEQ.

Next, overall operation of the multi-processor system 1 is described with reference to FIG. 3.

Figure 3:
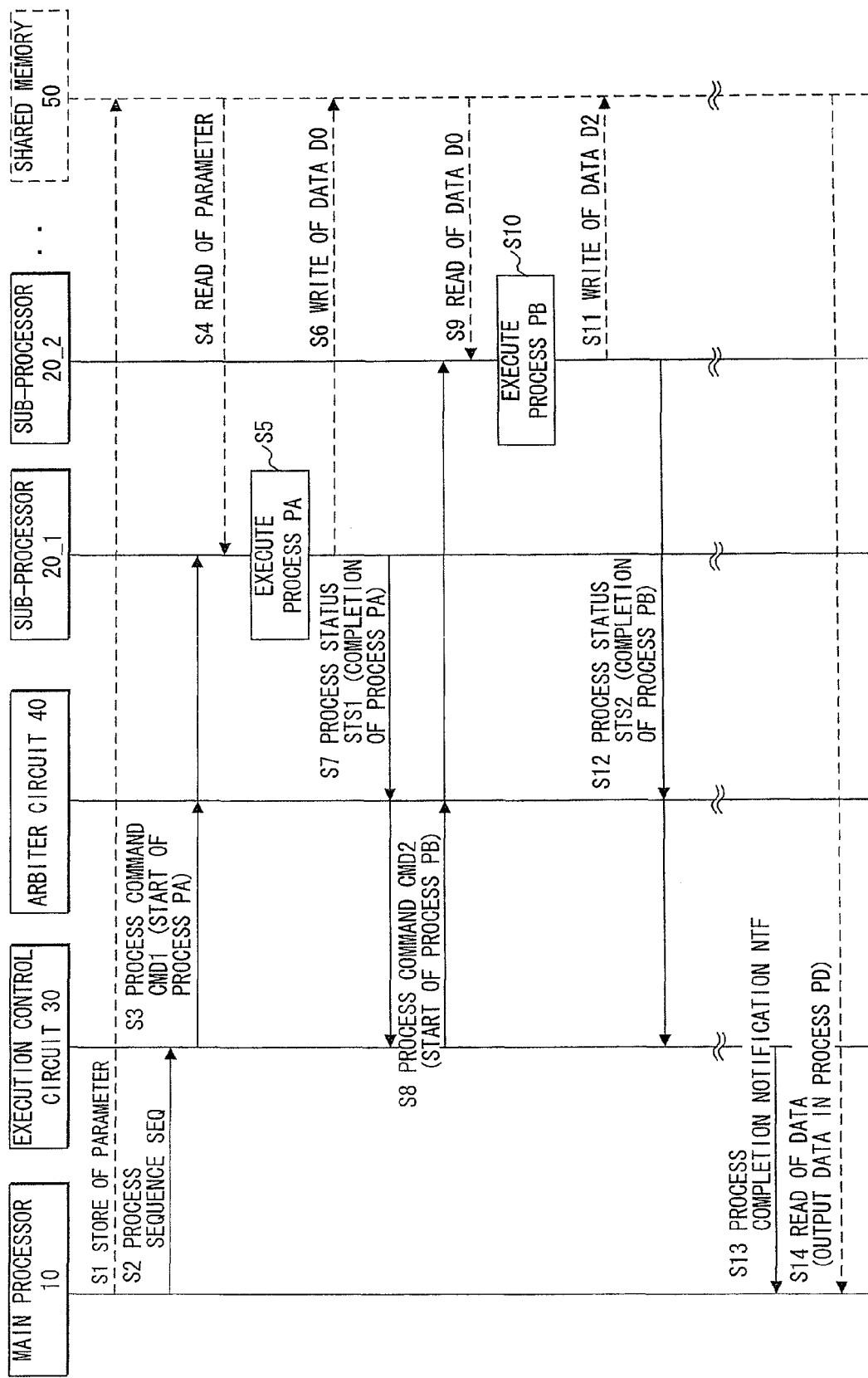
FIG. 3 is a sequence diagram showing an operation example which is common to exemplary embodiments of the multi-processor system according to the present invention.

As shown in FIG. 3, when there are parameters (including input data) for operating the sub-processors, the main processor 10 stores the parameters in e.g. a shared memory 50 which can be accessed from each sub-processor (Step S1). Then, the main processor 10 outputs the process sequence SEQ to the execution control circuit 30 (Step S2).

Figure 2:
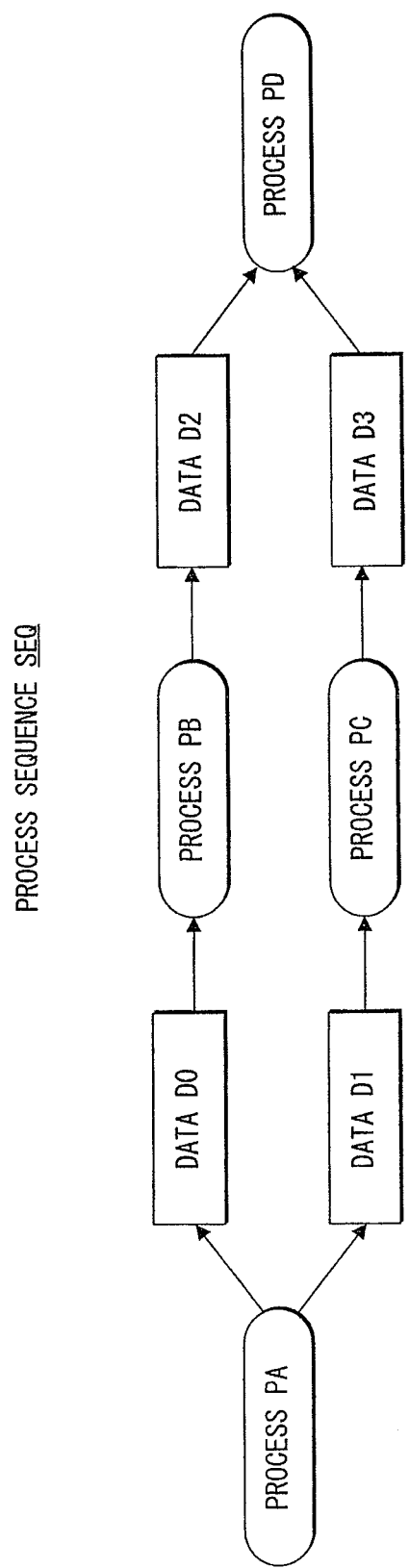
FIG. 2 is a diagram showing a configuration example of a process sequence which is commonly used in exemplary embodiments of the multi-processor system according to the present invention.

Taking the process sequence SEQ shown in FIG. 2 as an example, the execution control circuit 30 issues a process command CMD1 to start the process PA to e.g. the sub-processor 20_1, and outputs the process command CMD1 to the arbiter circuit 40. The arbiter circuit 40 transfers the process command CMD1 to the sub-processor 20_1 (Step S3).

The sub-processor 20_1 reads parameters required for the process PA from the shared memory 50 and executes the process PA, in accordance with the process command CMD1 (Steps S4 and S5). Then, the sub-processor 20_1 writes the data D0 obtained by the process PA in the shared memory 50 (Step S6).

After that, the sub-processor 20_1 transmits a process status STS1 which indicates completion of the process PA to the arbiter circuit 40. The arbiter circuit 40 transfers the process status STS1 to the execution control circuit (Step S7).

The execution control circuit 30 recognizes the completion of the process PA, and then outputs a process command CMD2 to start the process PB to e.g. the sub-processor 20_2 through the arbiter circuit 40 (Step S8).

The sub-processor 20_2 reads the data D0 required for the process PB from the shared memory 50 and executes the process PB, in accordance with the process command CMD2 (Steps S9 and S10). Then, the sub-processor 20_2 writes the data D2 obtained by the process PB in the shared memory 50 (Step S11), and transfers a process status STS2 which indicates completion of the process PB to the execution control circuit 30 through the arbiter circuit 40 (Step S12).

While not shown, in parallel with the above-mentioned Step S8, the execution control circuit 30 outputs a process command to start the process PC to any one of the sub-processor 20_1 and the sub-processors 20_3 to 20_n, in accordance with the process sequence SEQ. The sub-processor, which has received this process command, executes the process PC in parallel with the above-mentioned Steps S9 to S12, writes the data D1 obtained by the process PC in the shared memory 50, and transfers a process status which indicates completion of the process PC to the execution control circuit 30. Then, the execution control circuit 30 outputs a process command to start the process PD to any one of the sub-processors 20_1 to 20_n. The sub-processor, which has received this process command, executes the process PD, writes data obtained by the process PD in the shared memory 50, and transfer a process status which indicates completion of the process PD to the execution control circuit 30.

Then, the execution control circuit 30 recognizes that all of the processes PA to PD are completed, and then transmits the process completion notification NTF to the main processor 10 (Step S13). The main processor 10, which has received the process completion notification NTF, reads the output data in the process PD from the shared memory 50 (Step S14).

In this way, the multi-processor system 1 can parallelly controls the sub-processors without depending on the number thereof. Further, it is not necessary for the main processor 10 to perform execution control for the sub-processors 20_1 to 20_n until a series of process sequences are completed, so that it is possible to reduce processing load of the main processor 10. Note that the above-mentioned shared memory 50 is not essential. For example, the data may be exchanged between the main processor 10 and the sub-processors 20_1 to 20_n, by including the parameters required for each process in the process command CMD, and by including the output data obtained by each process in the process status STS or the process completion notification NTF.

Hereinafter, the first to fifth exemplary embodiments will be sequentially described in detail with reference to FIGS. 4 to 14, 15A and 15B, and 16 to 21.

First Exemplary Embodiment

Configuration Example

Figure 4:
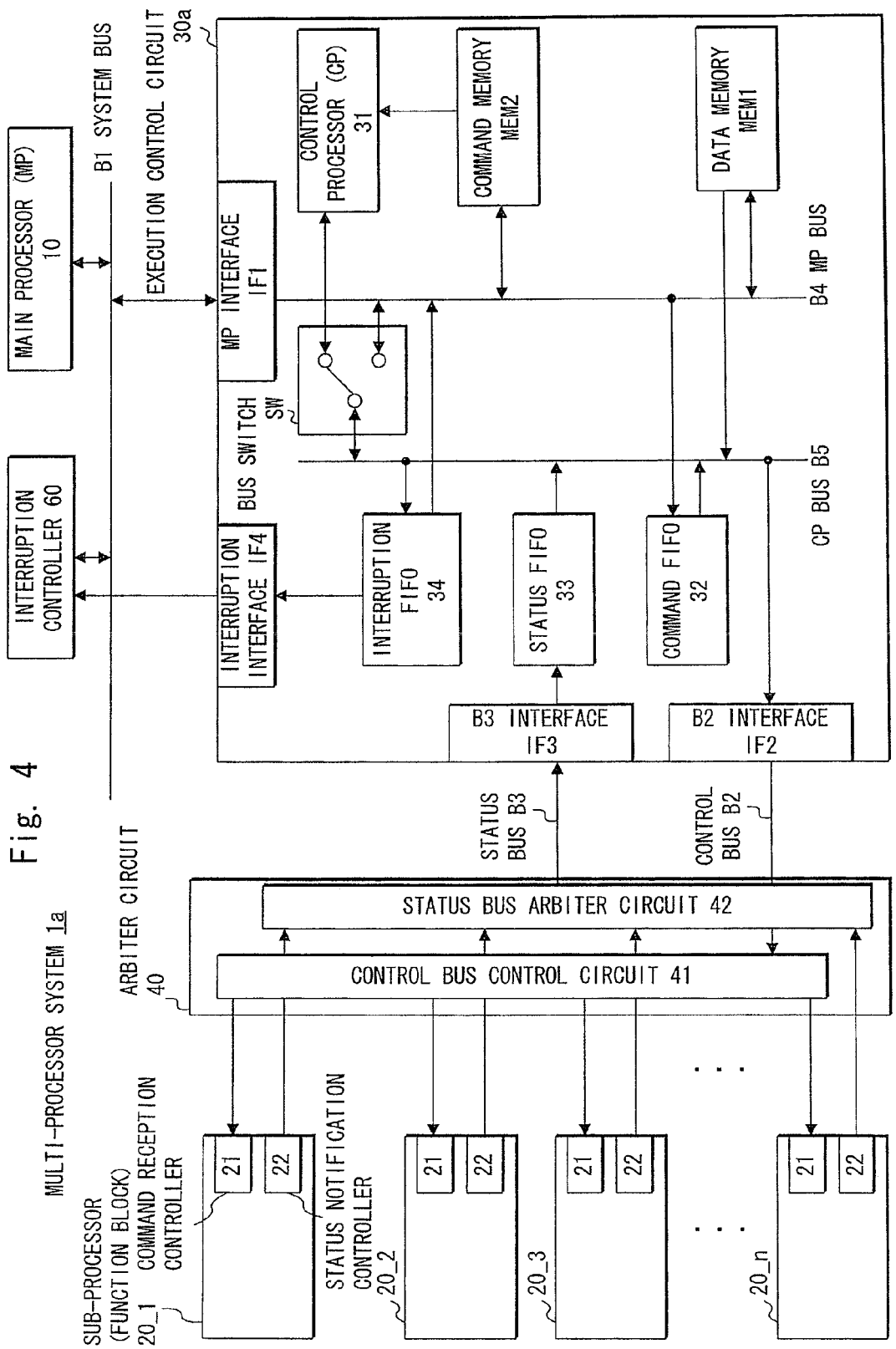
FIG. 4 is a block diagram showing a configuration example in a first exemplary embodiment of the multi-processor system according to the present invention.

As shown in FIG. 4, a multi-processor system 1a according to this exemplary embodiment includes a main processor 10, "n" units of sub-processors 20_1 to 20_n, an execution control circuit 30a which is connected to the main processor 10 through a system bus B1, an arbiter circuit 40 which is connected to the execution control circuit 30a through a control bus B2 and a status bus B3, and which connects the sub-processors 20_1 to 20_n in parallel to the buses B2 and B3, and an interruption controller 60 which is connected as a peripheral to the system bus B1 and the execution control circuit 30a. The control bus B2 is the one for transferring the above-described process command CMD. The status bus B3 is the one for transferring the process status STS.

Further, the execution control circuit 30a includes an interface (hereinafter, referred to as MP interface) IF1 to the main processor 10, an interface (hereinafter, referred to as B2 interface) IF2 to the control bus B2, an interface (hereinafter, referred to as B3 interface) IF3 to the status bus B3, and an interface (hereinafter, referred to as interruption interface) IF4 to the interruption controller 60.

Furthermore, the execution control circuit 30a includes a control processor (hereinafter, occasionally abbreviated as CP) 31, a data memory MEM1 for storing the process sequence SEQ input from the main processor 10 through the IF1, a command memory MEM2 in which instruction codes for analyzing the structures in the process sequence SEQ are preliminarily stored, a command FIFO 32 for storing a command (for example, a command to start the process sequence SEQ (hereinafter, sequence start command)) input from the main processor 10 through the IF1, a status FIFO 33 for storing the process status STS input through the IF3, and an interruption FIFO 34 used for notifying an interruption factor to the main processor 10. Since the interruption FIFO 34 is used, the multi-processor system 1a has high extensibility compared with a multi-processor system in which a general interruption factor register is implemented (in other words, the number of registers depends on the number of interruption factors). Further, since the status FIFO 33 is used, the multi-processor system 1a has high extensibility compared with a multi-processor system in which such a status register as described in the second related art is implemented. Furthermore, it is not necessary to implement the redundant hardware resource. Therefore, it is possible to prevent the cost of development from increasing.

The data memory MEM1, the command memory MEM2, the command FIFO 32 and the interruption FIFO 34 are connected to the IF1 through an MP bus B4. Further, the control bus B2, the data memory MEM1, the command FIFO 32, the status FIFO 33 and the interruption FIFO 34 are mutually connected through a CP bus B5. Furthermore, a bus switch SW enables the main processor 10 and the control processor 31 to select the right of access to the CP bus B5. Upon normal operation, the control processor 31 acquires the right of access to the CP bus B5 as shown in FIG. 4. On the other hand, upon a test or the like, the main processor 10 acquires the right of access to the CP bus B5.

Further, the arbiter circuit 40 includes a control bus control circuit 41 which controls transfer of the process command CMD to the control bus B2, and a status bus arbiter circuit 42 which arbitrates access from the sub-processors 20_1 to 20_n to the status bus B3 upon transferring the process status STS. As shown in FIG. 4, each of the control bus control circuit 41 and the status bus arbiter circuit 42 can be simply materialized in a single-layer bus configuration.

Further, each of the sub-processors 20_1 to 20_n includes a command reception controller 21 which receives the process command CMD from the execution control circuit 30a through the control bus B2, and a status notification controller 22 which transmits the process status STS to the execution control circuit 30a through the status bus B3. In other words, the command reception controller 21 is connected as a slave (reception side) of the control bus B2, and has a function of transmitting the acquired process command CMD inside the sub-processor. Further, the status notification controller 22 is connected as a master (transmission side) of the status bus B3, and has a function of transferring the process status STS generated in the sub-processor to the execution control circuit 30a.

Operation Example

Next, operation of this exemplary embodiment is described with reference to FIGS. 5 to 9. FIGS. 5 to 7 and 9 show the operation equivalent respectively to the Step S2 (hereinafter, process sequence setting operation), the Step S3 (hereinafter, process command issuing operation), the Step S7 (hereinafter, process status notifying operation), and the Step S13 (hereinafter, process completion notifying operation) shown in FIG. 3. Further, FIG. 8 shows a format example of the process status STS used in this exemplary embodiment.

[Example of Process Sequence Setting Operation]

Figure 5:
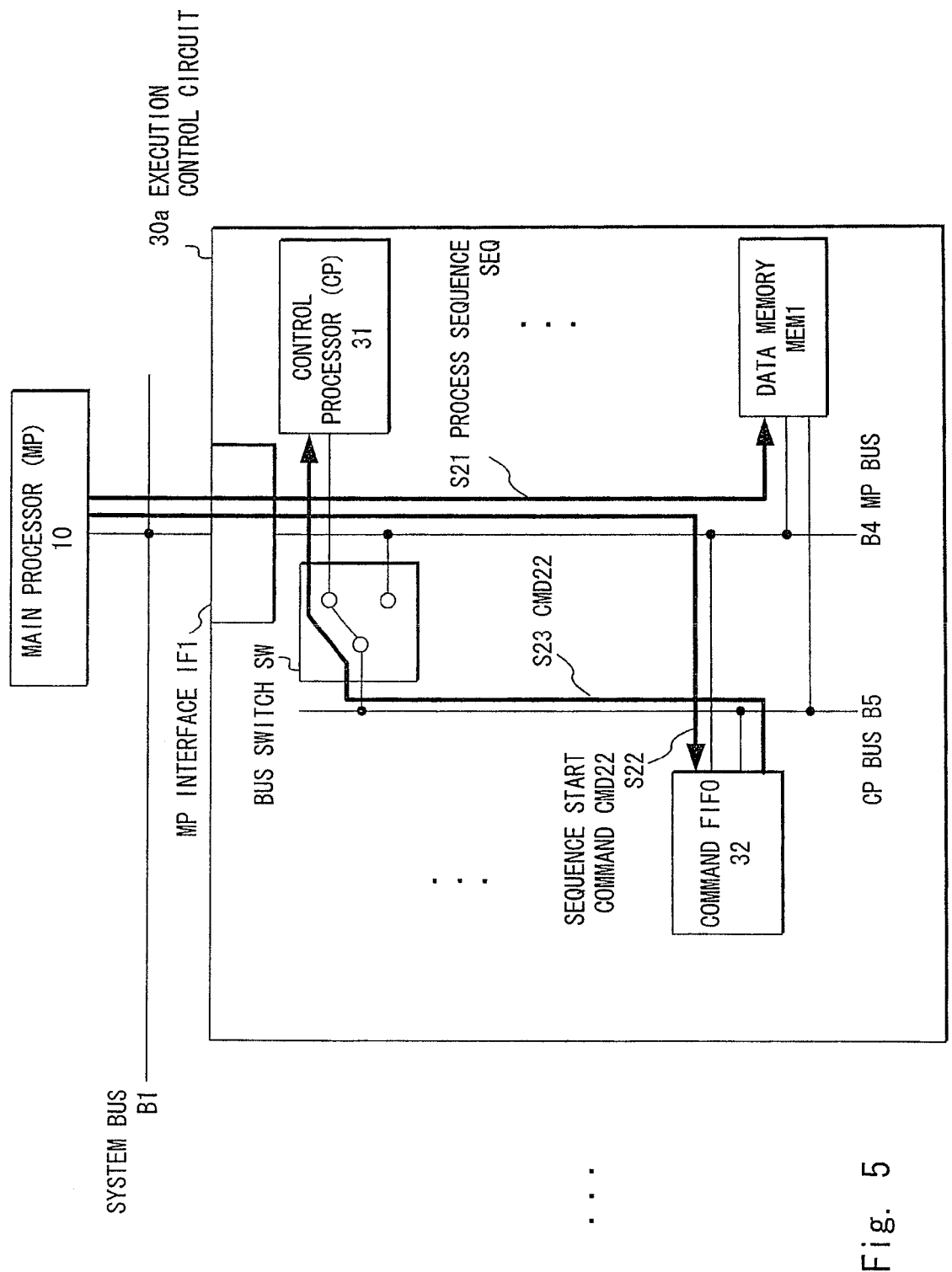
FIG. 5 is a block diagram showing an operation example of setting a process sequence in the first exemplary embodiment of the multi-processor system according to the present invention.

As shown in FIG. 5, the main processor 10 firstly stores the process sequence SEQ in the data memory MEM1 through the MP interface IF1 and the MP bus B4 in the execution control circuit 30a (Step S21). Then, the main processor 10 writes a sequence start command CMD22 in the command FIFO 32 (Step S22). At this time, an interruption signal generated by the command FIFO 32 is received at the control processor 31. The control processor 31, which has received the interruption signal, acquires the sequence start command CMD22 from the command FIFO 32 (Step S23). Note that the process sequence SEQ may be preliminarily stored in the data memory MEM1 upon initial activation or the like, as with the instruction codes in the command memory MEM2.

[Example of Process Command Issuing Operation]

Figure 6:
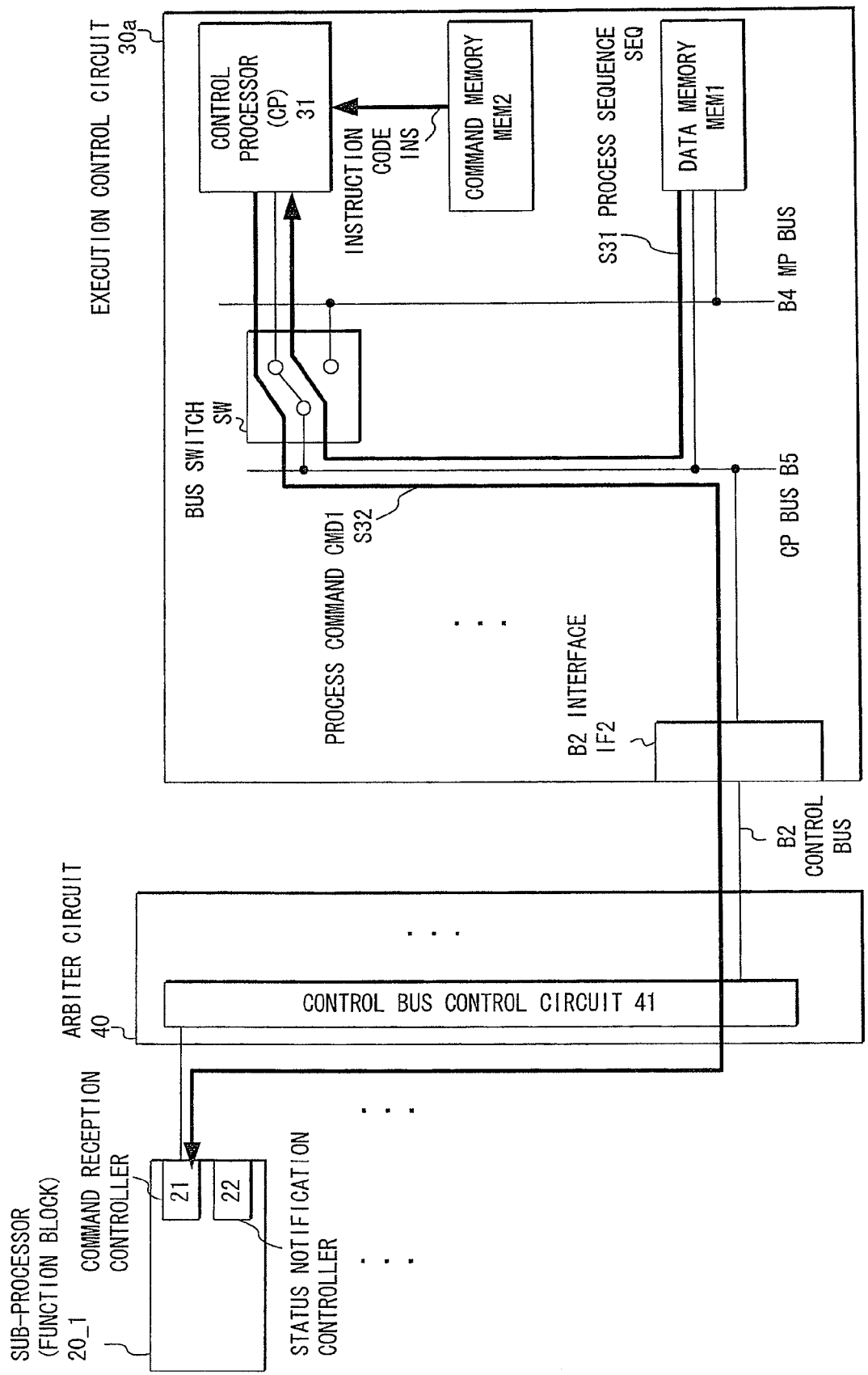
FIG. 6 is a block diagram showing an operation example of issuing a process command in the first exemplary embodiment of the multi-processor system according to the present invention.

After the above-mentioned process sequence setting operation, as shown in FIG. 6, the control processor 31 firstly reads the process sequence SEQ from the data memory MEM1 (Step S31).

Then, the control processor 31 executes the instruction codes INS read from the command memory MEM2 and analyzes a linkage relationship between processes and data defined in the process sequence SEQ, thereby determine a process command to be issued next time. Further, the control processor 31 recognizes which process has been executed and which sub-processor is in operation based on the acquired process status STS, and determines an issuing destination of the process command. Specifically, if input data required for the process to be executed next time is completed, a writing destination of output data is available, and a sub-processor (operation resource) which can execute this process is not in operation, the control processor 31 determines this sub-processor as the issuing destination of the process command.

Assuming that the process command CMD1 shown in FIG. 3 is determined as the process command to be issued next time, and that the sub-processor 20_1 is determined as an issuing destination of the process command CMD1. The control processor 31 outputs the process command CMD 1 to the control bus control circuit 41 in the arbiter circuit 40 sequentially through the bus switch SW, the CP bus B5, the B2 interface IF2, and the control bus B2. The control bus control circuit 41 performs address decoding for access from the execution control circuit 30a to the control bus, and transfers the process command CMD1 to the sub-processor 20_1 selected as a result of the address decoding. The command reception controller 21 in the sub-processor 20_1 transmits necessary parameters such as a process ID (instruction number) set in the process command CMD1 inside the sub-processor 20_1, so that a process in accordance with the process ID is executed (Step S32).

Note that in a case of processes where input data is continuously generated, the control processor 31 can also make the sub-processors 20_1 to 20_n execute a series of processes in a pipelined parallel manner.

[Example of Process Status Notifying Operation]

Figure 7:
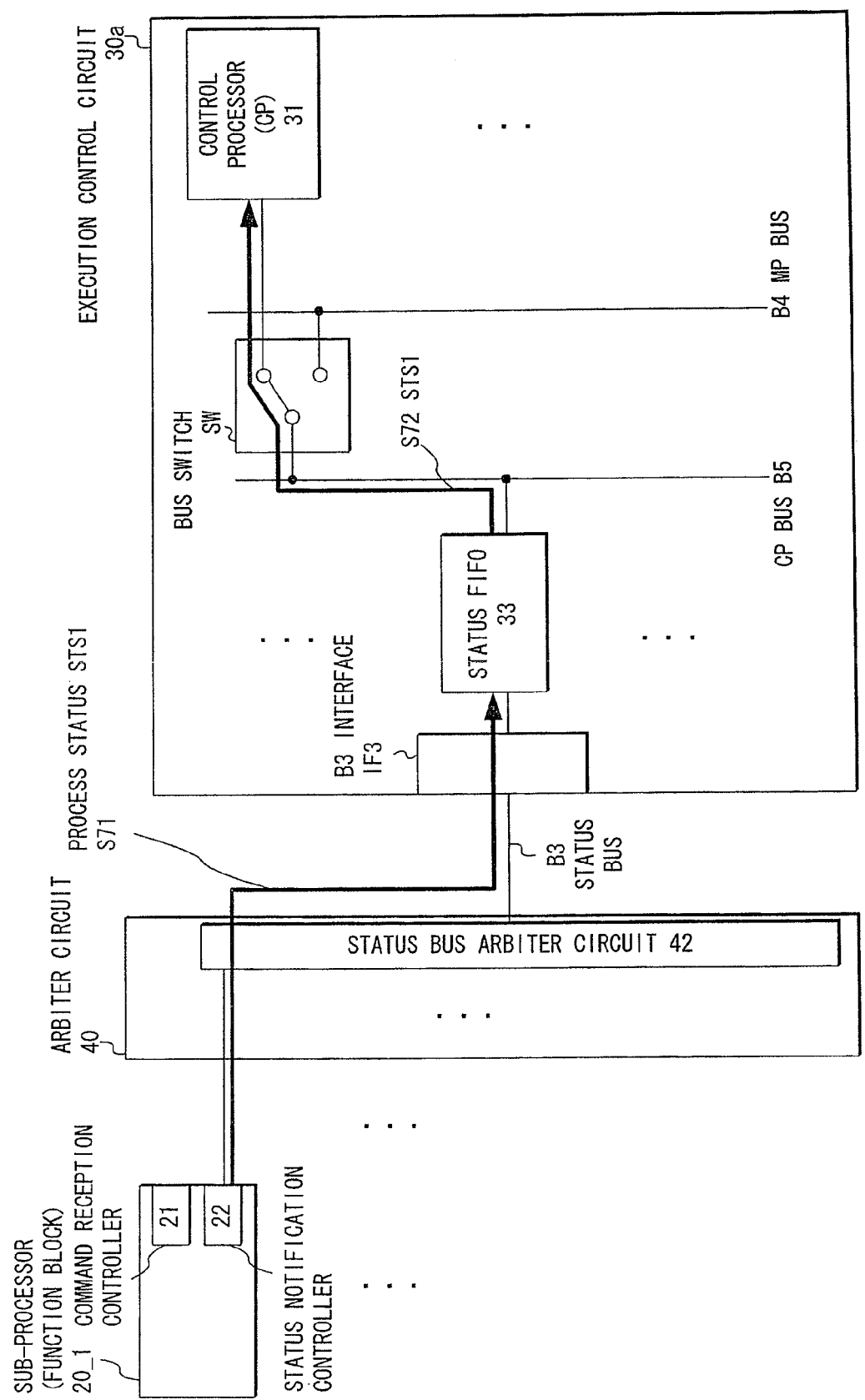
FIG. 7 is a block diagram showing an operation example of notifying a process status in the first exemplary embodiment of the multi-processor system according to the present invention.
Figure 8:
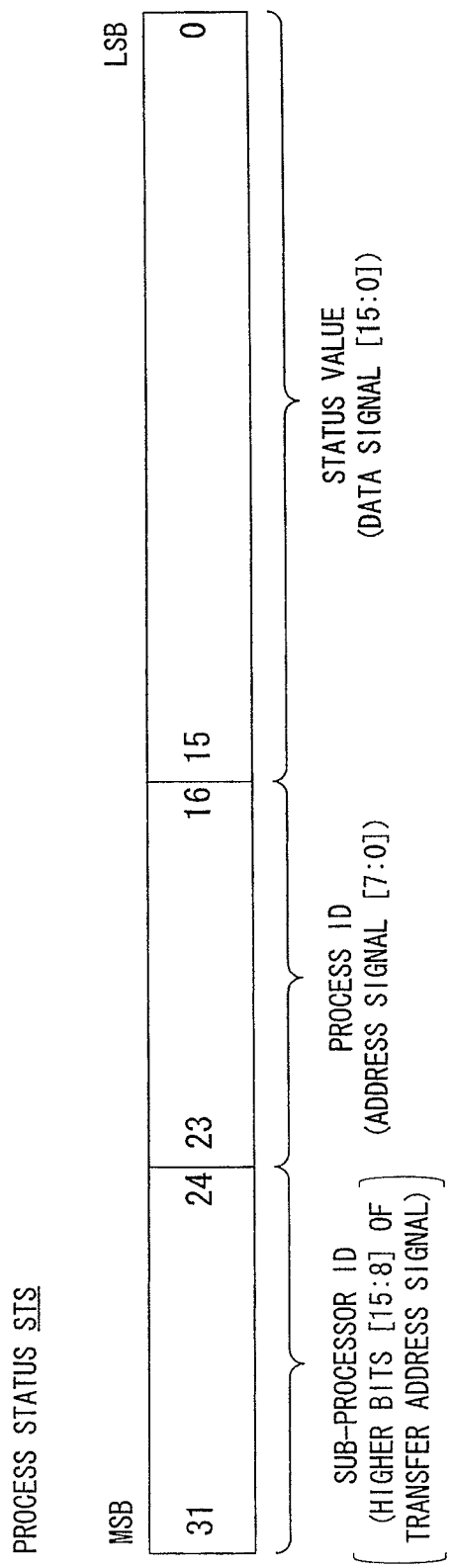
FIG. 8 is a diagram showing a format example of the process status which is used in the first exemplary embodiment of the multi-processor system according to the present invention.

After the above-mentioned process command issuing operation, as shown in FIG. 7, the status notification controller 22 in the sub-processor 20_1 outputs the process status STS1 shown in FIG. 3 to the status bus B3. The status bus arbiter circuit 42 transfers the process status STS1 to the execution control circuit 30a. When access from another sub-processor to the status bus conflicts, the status bus arbiter circuit 42 performs access arbitration in a round-robin fashion or the like, and transfers the process status from the sub-processor selected as a result of the access arbitration to the execution control circuit 30a. The B3 interface IF3 in the execution control circuit 30a stores the process status STS1 in the status FIFO 33 (Step S71).

At this time, an interruption signal generated by the status FIFO 33 is received at the control processor 31. The control processor, which has received the interruption signal, acquires the process status STS1 from the status FIFO 33 (Step S72).

FIG. 8 shows a format example of the process status STS. In this example, the process status STS is composed of 32 bits. The first 8 bits from MSB (Most Significant Bit) are allocated as a setting area for a sub-processor ID. The subsequent 8 bits are allocated as a setting area for the process ID. The last 16 bits are allocated as a setting area for a status value (which indicates completion of reading the input data, completion of writing the output data, completion of the process, or the like). Each of the sub-processors 20_1 to 20_n outputs the process ID and the status value respectively as an address signal [7:0] of the status bus B3 and a data signal [15:0] to the status bus arbiter circuit 42. The status bus arbiter circuit 42 adds the sub-processor ID as upper bits [15:8] in a transferring address signal to the process ID and the status value to be transferred to the execution control circuit 30a. Further, the B3 interface IF3 stores the sub-processor ID, the process ID and the status value as one process status STS in the status FIFO 33.

Therefore, the control processor 31 has only to read the process status STS from the status FIFO 33 to be able to recognize which process executed by which sub-processor is in which status.

[Example of Process Completion Notifying Operation]

Figure 9:
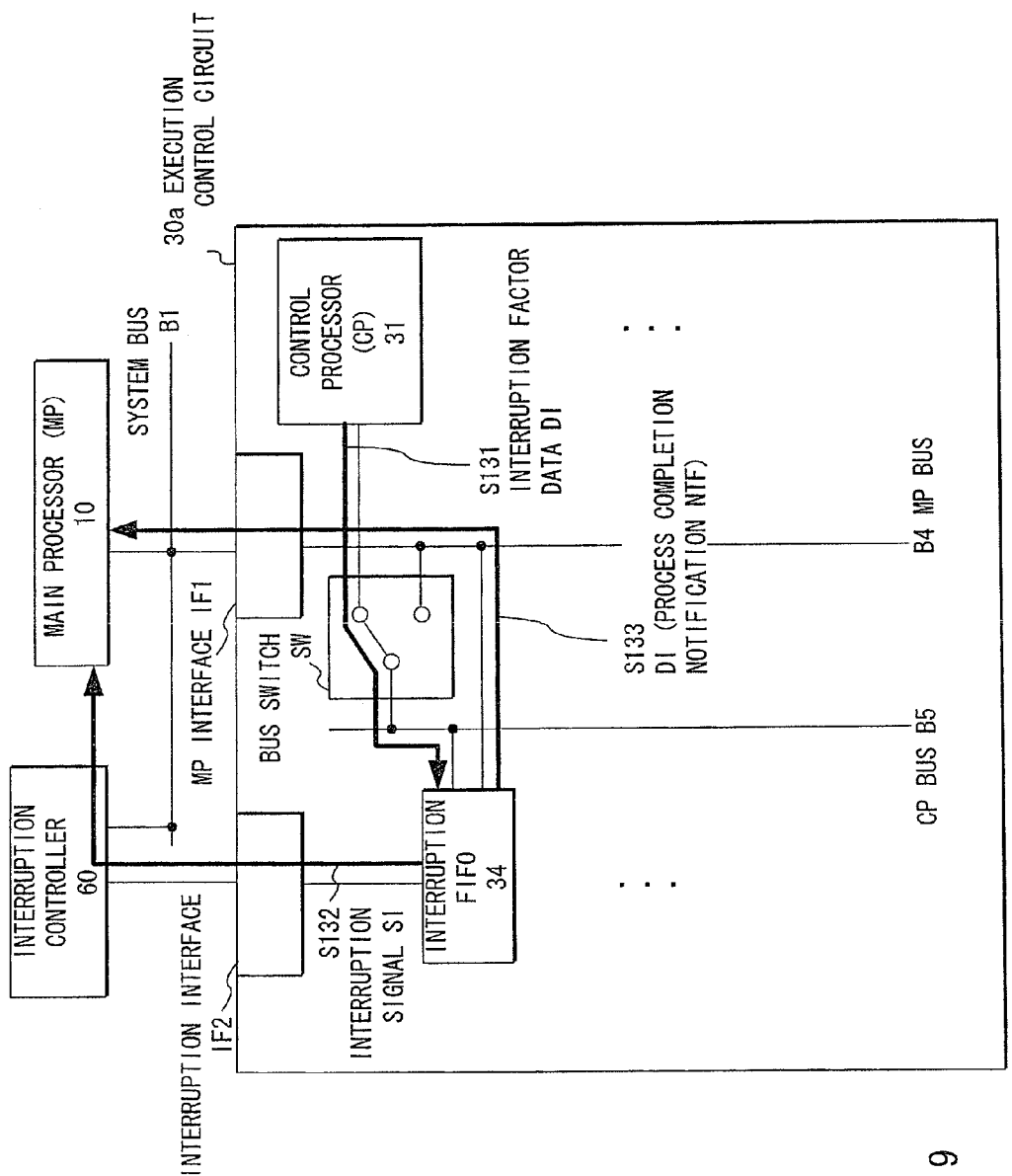
FIG. 9 is a block diagram showing an operation example of notifying process completion in the first exemplary embodiment of the multi-processor system according to the present invention.

When completion of the process sequence SEQ (completion of all processes) is recognized by the above-mentioned process status notifying operation, as shown in FIG. 9, the control processor 31 stores interruption factor data DI which indicates completion of the sequence (process completion notification NTF shown in FIG. 3) in the interruption FIFO 34 (Step S131). At this time, an interruption signal SI generated by the interruption FIFO 34 is received at the interruption controller 60 through the interruption interface IF2. The generation of the interruption is transmitted from the interruption controller 60 to the main processor 10 (Step S132). Then, the main processor 10 acquires the interruption factor data DI from the interruption FIFO 34 through the MP interface IF1 and the MP bus B4, thereby recognizing the completion of the sequence (Step S133).

Next, a first example of the application of the multi-processor system 1a according to this exemplary embodiment to a data processing system, and a second example of the application thereof to a codec system will be respectively described with reference to FIGS. 10 and 11.

[First Example of Application]

Figure 10:
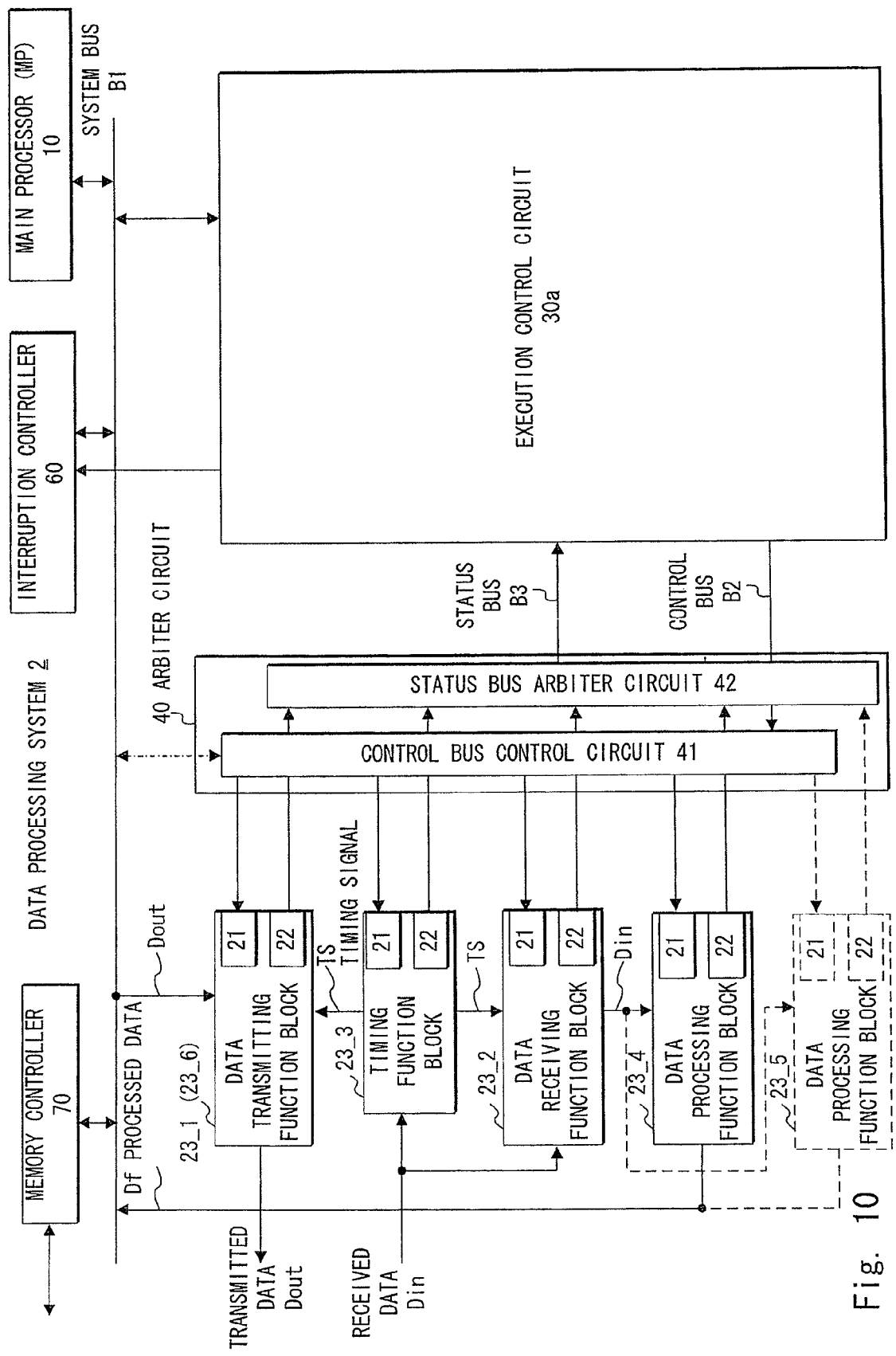
FIG. 10 is a block diagram showing a first example of the application of the multi-processor system according to the present invention.

As shown in FIG. 10, a data processing system 2 includes the same main processor 10, execution control circuit 30a, arbiter circuit 40 and interruption controller 60 as those of the multi-processor system 1a. Further, a memory controller 70 which controls access to an external memory (not shown) is connected to the system bus B1. Furthermore, a data transmitting function block 23_1 which transmits data Dout outside the system, a data receiving function block 23_2 which receives data Din from outside the system, a timing function block 23_3 which generates from the received data Din a timing signal TS to be output to the function blocks 23_1 and 23_2, and a data processing function block 23_4 which performs a predetermined process for the received data Din output from the function block 23_2, and stores the processed data Df in the external memory through the memory controller 70 are used as sub-processors. Each of the function blocks 23_1 to 23_4 includes the above-described command reception controller 21 and status notification controller 22. Note that as shown as alternate long and short dash lines in FIG. 10, it may be possible to perform access from the system bus B1 to the control bus control circuit 41. In this case, it is also possible for the main processor 10 to directly control the function blocks 23_1 to 23_4.

In operation of receiving the data, the main processor 10 outputs a process sequence for receiving and a start command thereof to the execution control circuit 30a. Then, the execution control circuit 30a analyzes the process sequence for receiving, and issues a process command to start generation of the timing signal TS to the timing function block 23_3. When a process status which indicates completion of a process to start the generation of the timing signal TS is received from the timing function block 23_3, the execution control circuit 30a issues a process command to start reception of the data Din to the data receiving function block 23_2. When a process status which indicates completion of a process to start the reception is received from the data receiving function block 23_2, the execution control circuit 30a issues a process command to write the processed data Df in the external memory to the data processing function block 23_4. When a process status which indicates completion of a process to write the processed data Df is received from the data processing function block 23_4, the execution control circuit 30a notifies the main processor 10 of an interruption which indicates completion of receiving process.

At this time, the data processing function block 23_4 issues a process status indicating completion of acquisition at timing when the received data Din is acquired from the data receiving function block 23_2. Thus, the execution control circuit 30a can issue to the data receiving function block 23_2 a process command to output the received data Din to the data processing function block 23_4 in synchronization with the next timing signal TS. Therefore, it is not necessary for the data receiving function block 23_2 to check the operating status of the data processing function block 23_4. Accordingly, the data processing system 2 can concurrently execute the process to receive the data Din, and the process to write the processed data Df in the external memory. As a result, the function blocks operate in a pipelined parallel manner.

On the other hand, in operation of transmitting the data, the execution control circuit 30a receives the completion of the process to start the generation of the timing signal TS from the timing function block 23_3 and completion of writing the transmitted data Dout in the external memory from the main processor 10, and then issues a process command to transmit the transmitted data Dout outside the system to the data transmitting function block 23_1. At this time, the data transmitting function block 23_1 issues a process status indicating completion of acquisition at timing when the transmitted data Dout is acquired from the external memory. Thus, the execution control circuit 30a can notify the main processor 10 of an interruption which indicates that the next transmitted data Dout can be written in the external memory. Therefore, it is not necessary for the main processor 10 to check the operating status of the data transmitting function block 23_1. Accordingly, the data processing system 2 can concurrently execute the process to transmit the data Dout, and a process to write the next transmitted data Dout in the external memory. As a result, the function blocks operate in a pipelined parallel manner.

Further, it is not necessary at all to change the circuit configuration of the execution control circuit 30a, even in a case of adding a data processing function block 23_5 as shown as dotted lines in FIG. 10, in a case of adding a data transmitting function block 23_6, or in a case of expanding the function of the data transmitting function block 23_1.

Second Example of Application

Figure 11:
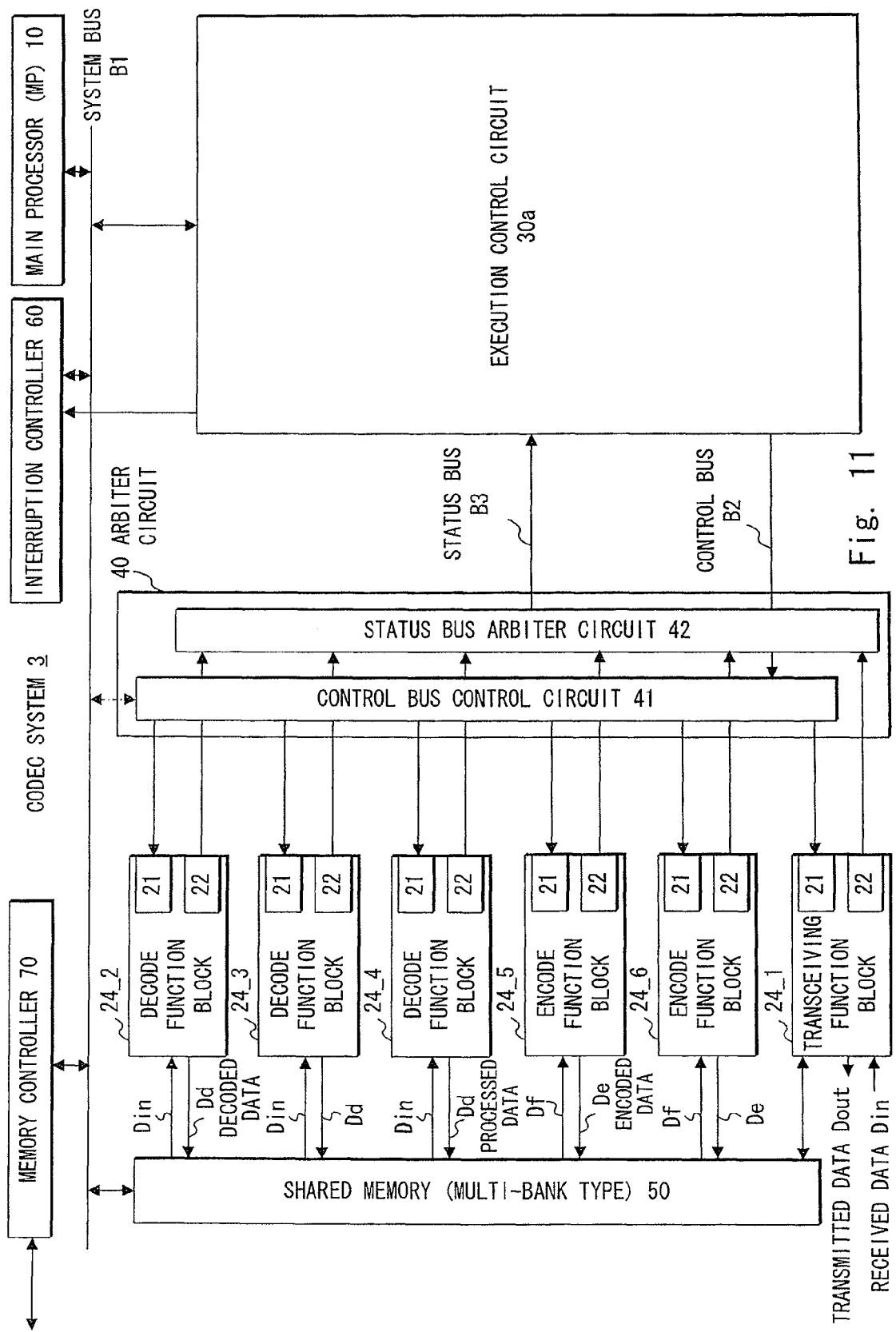
FIG. 11 is a block diagram showing a second example of the application of the multi-processor system according to the present invention.

As shown in FIG. 11, a codec system 3 uses as the sub-processors, in place of the function blocks 23_1 to 23_6 shown in the first example of the application described above, a transceiving function block 24_1 which transmits a data signal Dout outside the system and receives a data signal Din from outside the system, decode function blocks 24_2 to 24_4 each of which performs a decoding process for the received data Din to obtain decoded data Dd, and encode function blocks 24_5 and 24_6 each of which performs an encoding process for processed data Df output from the main processor 10 to obtain encoded data De. Each of the function blocks 24_1 to 24_6 includes the above-described command reception controller 21 and status notification controller 22. Further, the received data Din, the decoded data Dd, the processed data Df and the encoded data De are exchanged through a shared memory 50 of multi-banked type. Therefore, the function blocks 24_1 to 24_6 can access different banks in parallel. Further, each data is exchanged through the shared memory 50. Therefore, it is not necessary to conduct direct communication between the function blocks. Furthermore, the main processor 10 preliminarily writes parameters required for processing in the shared memory 50, whereby each function block autonomously acquires the parameters from the shared memory 50 upon receiving a process command to start from the execution control circuit 30a. Therefore, the execution control circuit 30a has only to issue a process command which includes the process ID and an address (pointer) of the stored parameter on the shared memory 50, and can control the function blocks in common. Note that as shown as alternate long and short dash lines in FIG. 11, it may be possible to perform access from the system bus B1 to the control bus control circuit 41. In this case, it is also possible for the main processor 10 to directly control the function blocks 24_1 to 24_6.

In operation of encoding the data, the main processor 10 outputs a process sequence for encoding and a start command thereof to the execution control circuit 30a. Then, the execution control circuit 30a analyzes the process sequence for encoding, and issues a process command to request the encoding process for the processed data Df to the encode function block 24_5 upon receiving from the main processor 10 completion of writing the processed data Df in the shared memory 50. When a process status which indicates completion of the encoding process is received from the encode function block 24_5, the execution control circuit 30a issues a process command to request the encoding process for the processed data Df to the encode function block 24_6. When a process status which indicates completion of the encoding process is received from the encode function block 24_6, the execution control circuit 30a issues a process command to transmit the encoded data De outside the system to the transceiving function block 24_1.

At this time, the encode function block 24_5 issues a process status indicating completion of acquisition at timing when the processed data Df from the main processor 10 is acquired from the shared memory 50. Thus, the execution control circuit 30a can notify the main processor 10 of an interruption which indicates that processed data Df for the next frame can be written in the shared memory 50. Therefore, the main processor 10 can execute a process to write the processed data Df in the shared memory 50 in parallel with the encoding process by the encode function block 24_5. As a result, the function blocks operate in a pipelined parallel manner.

On the other hand, in operation of decoding the data, the main processor 10 outputs a process sequence for decoding and a start command thereof to the execution control circuit 30a. Then, the execution control circuit 30a analyzes the process sequence for decoding, and issues a process command to request the decoding process for the received data Din to the decode function block 24_2 upon receiving from the transceiving function block 24_1 process statuses which are constantly and periodically generated and each of which indicates completion of writing the received data Din in the shared memory 50. When a process status indicating completion of the decoding process is received from the decode function block 24_2, the execution control circuit 30a issues a process command to request the decoding process for the received data Din to the decode function block 24_3. When a process status indicating completion of the decoding process is received from the decode function block 24_3, the execution control circuit 30a issues a process command to request the decoding process for the received data Din to the decode function block 24_4. When a process status indicating completion of the decoding process is received from the decode function block 24_4, the execution control circuit 30a notifies the main processor 10 of an interruption which indicates that the decoded data Dd can be read from the shared memory.

At this time, the decode function block 24_3 issues a process status indicating completion of acquisition at timing when the received data Din is acquired from the shared memory 50. Thus, the execution control circuit 30a can issue a process command to read received data Din for the next frame from the shared memory 50 to the decode function block 24_2. Therefore, it is not necessary for the decode function block 24_2 to check the operating status of the decode function block 24_3. Accordingly, it is possible to concurrently execute the decoding process and a process to read the received data Din. As a result, the function blocks operate in a pipelined parallel manner.

Further, as each of the encode function blocks 24_2 to 24_4, and the encode function blocks 24_5 and 24_6, the one which is compatible with a plurality of decoding schemes may be used. In this case, each of the decode function blocks and the encode function blocks selects one decoding scheme in accordance with the process command (process ID) received from the execution circuit 30a. Process sequences corresponding to the respective decoding schemes are set in the execution control circuit 30a. In a case of changing the whole system from a certain decoding scheme to a different decoding scheme, the main processor 10 sets a process sequence for the different decoding scheme in the execution control circuit 30a, so that it is possible to easily switch the decoding scheme. Further, as described above, the status FIFO 33 stores the process ID and the status value in pairs. Therefore, the status FIFO 33 can be shared in the respective decoding schemes.

In this way, the multi-processor system according to this exemplary embodiment can be applied to various systems. Further, there is an advantage of simplifying reconfiguration and reuse of the system. Note that the above-mentioned data processing system 2 and codec system 3 may be configured by using one of multi-processor systems according to the second to fifth exemplary embodiments which will be described later.

Next, the second exemplary embodiment is described with reference to FIGS. 12 to 14, 15A and 15B, and 16.

Second Exemplary Embodiment

Configuration Example

Figure 12:
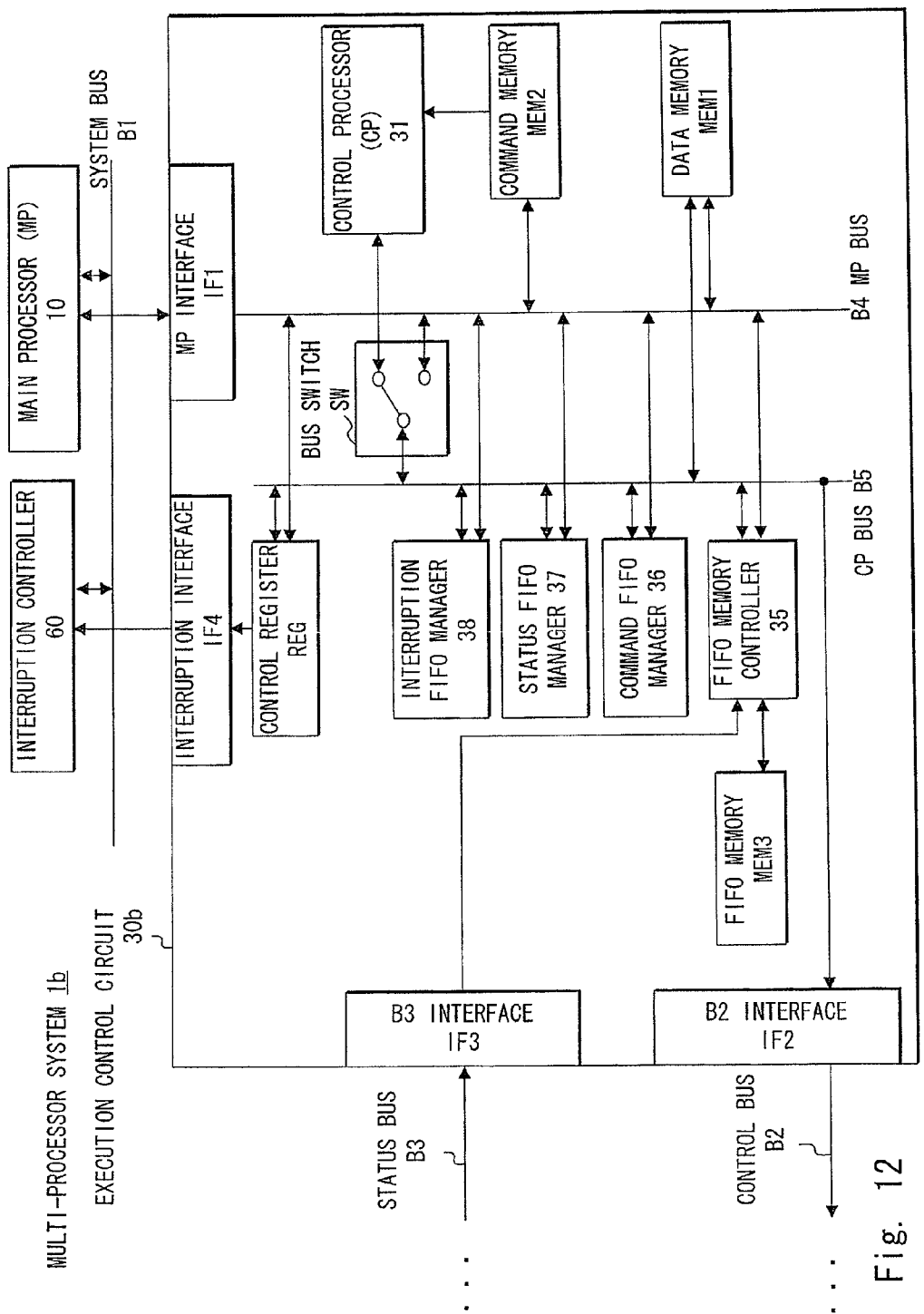
FIG. 12 is a block diagram showing a configuration example in a second exemplary embodiment of a multi-processor system according to the present invention.

As shown in FIG. 12, a multi-processor system 1b according to this exemplary embodiment is different from the above-mentioned first exemplary embodiment, in that it includes an execution control circuit 30b as substitute for the execution control circuit 30a in the multi-processor system 1a shown in FIG. 4. Note that although the illustration is omitted, the multi-processor system 1b includes "n" units of sub-processors 20_1 to 20_n and the arbiter circuit 40 which arbitrates transfer of the process command CMD and the process status STS between the sub-processors and the execution control circuit 30b, as with the multi-processor system 1a.

The execution control circuit 30b includes a FIFO memory MEM3, a FIFO memory controller 35, a command FIFO manager 36, a status FIFO manager 37, an interruption FIFO manager 38 and a control register REG, as substitute for the command FIFO 32, the status FIFO 33 and the interruption FIFO 34 shown in FIG. 4. On the address space in the FIFO memory MEM3, there are formed a command FIFO area, a status FIFO area and an interruption FIFO area which are equivalent respectively to the command FIFO 32, the status FIFO 33 and the interruption FIFO 34. The FIFO memory controller 35 controls access to the FIFO memory MEM3. The command FIFO manager 36 holds management information regarding the command FIFO area. The status FIFO manager 37 holds management information regarding the status FIFO area. The interruption FIFO manager 38 holds management information regarding the interruption FIFO area. The control register REG holds control information regarding the command FIFO area, the status FIFO area, the interruption FIFO area and the FIFO memory MEM3.

Further, the FIFO memory controller 35, the command FIFO manager 36, the status FIFO manager 37, the interruption FIFO manager 38 and the control register REG are each connected to the MP bus B4 and the CP bus B5. The process status STS from the status bus B3 is input to the FIFO memory controller 35 through the B3 interface IF3. Further, the control register REG outputs an interruption signal generated by the interruption FIFO manager 38 to the interruption controller 60 through the interruption interface IF4, and outputs interruption signals generated by the command FIFO manager 36 and the status FIFO manager 37 to the control processor 31.

Figure 13:
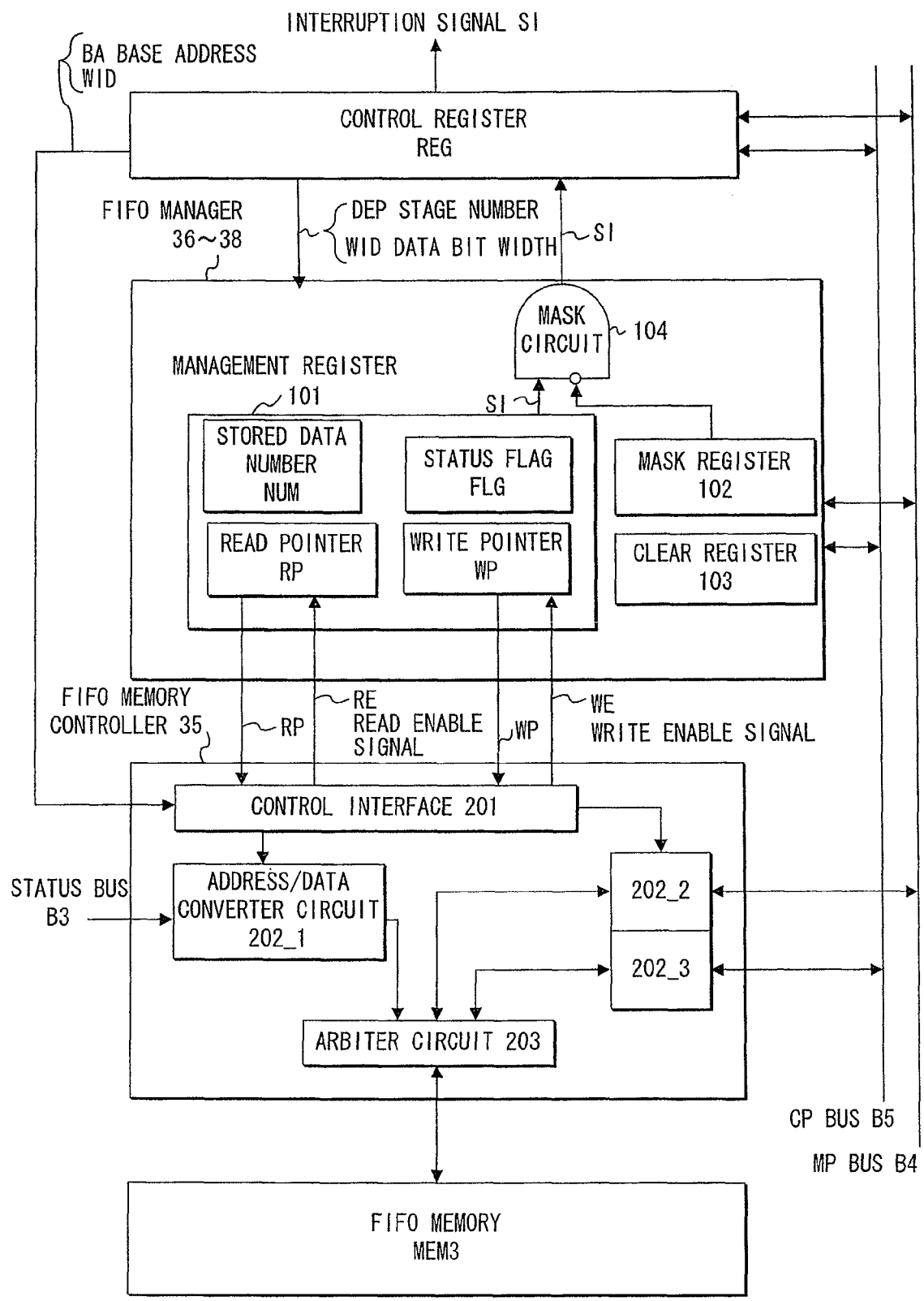
FIG. 13 is a block diagram showing a configuration example of a control register, a FIFO manager and a FIFO memory controller, which are used in the second exemplary embodiment of the multi-processor system according to the present invention.

Specifically, as shown in FIG. 13, each of the FIFO managers 36 to 38 includes a management register 101, a mask register 102, a clear register 103 and a mask circuit 104. The management register 101 includes a write pointer WP for managing a write address to each FIFO area, a read pointer RP for managing a read address from each FIFO area, stored data number NUM holding the number of data stored in each FIFO area, and a status flag FLG indicating whether each FIFO area is in Full status or Empty status. The mask register 102 holds binary data which indicates whether or not to output an interruption signal SI generated by the management register 101 to the control register REG (whether or not to mask the interruption) when write access to each FIFO area occurs. The clear register 103 holds binary data which indicates whether or not to clear the information in the management register 101. The mask circuit 104 masks the interruption signal SI in accordance with the output value from the mask register 102.

The status flag FLG is used for representing and observing the status of the FIFO area. The status flag FLG is composed of two bits of Empty flag and Full flag for example. The Empty flag is set to "1" when the FIFO area is in the Empty status. The Full flag is set to "1" when the FIFO area is in the Full status. The Full flag is reset to "0" by reading the data from the FIFO area. Further, the information in the management register 101 is initialized to zero by writing "1" in the clear register 103. Furthermore, the mask register 102 is used for masking output of an interruption signal which is generated at a time when the data is written in the FIFO area. If the value of the mask register 102 is set to "1" (masked status), the interruption signal is not output even when the data is written in the FIFO area. Meanwhile, if there is data in the FIFO area at timing when the mask is canceled (at timing when the value of the mask register 102 is changed from "1" to "0"), the interruption signal is output. Thus, it is possible to prevent the data in the FIFO from being lost, and to prevent the interruption signal from being unnecessarily generated.

Further, the control register REG stores therein a base address BA of each FIFO area allocated on the FIFO memory MEM3, the number DEP of stages of data which can be stored in each FIFO area, and a data bit width WID of the data stored in each FIFO area (in other words, the above-described sequence start command CMD22, process status STS and interruption factor data DI). The stage number DEP and the data bit width WID are output to each of the FIFO managers 36 to 38.

The above-mentioned write pointer WP is incremented by the number corresponding to the data bit width WID (the number of byte units), every time a write enable signal WE becomes active. For example, in a case where the data bit width WID equals to "16 bits", the write pointer WP is incremented by two every time the data is written in the FIFO area. In a case where the data bit width WID equals to "32 bits", the write pointer WP is incremented by four. Meanwhile, the write pointer WP is initialized to zero when its value reaches the one equivalent to the stage number DEP, and then the above-mentioned increment is performed again. The read pointer RP is incremented as with the write pointer WP, every time a read enable signal RE becomes active. The stored data number NUM is used for representing and observing the number of data stored in the FIFO area. The stored data number NUM is calculated based on a difference between the value of the write pointer WP and the value of the read pointer RP. In other words, the data number NUM increases by one when the data is written in the FIFO area. The data number NUM decreases by one when the data is read from the FIFO area.

Furthermore, the FIFO memory controller 35 includes a control interface 201, address/data converter circuits 202_1 to 202_3, and an arbiter circuit 203. The control interface 201 outputs the write enable signal WE and the read enable signal RE for each FIFO area to the management register 101, and receives the write pointer WP, the read pointer RP, the base address BA and the data bit width WID from the management register 101. The address/data converter circuits 202_1 to 202_3 are respectively connected to the status bus B3, the MP bus B4 and the CP bus B5, and perform conversion processes for the address based on the write pointer WP, the read pointer RP, the base address BA and the data bit width WID output from the control interface 201. Further, the address/data converter circuits 202_1 to 202_3 perform conversion processes for data to be transferred to data buses or for data acquired from the data buses, based on a difference between the data bit width WID and a data bit width of the FIFO memory MEM3 (in other words, width of parallel data buses connected to the MEM3). The arbiter circuit 203 arbitrates access from the address/data converter circuits 202_1 to 202_3 to the data buses.

Operation Example

Next, operation of this exemplary embodiment is described with reference to FIGS. 14, 15A and 15B, and 16. Note that operation which does not relate to access to the FIFO area in the execution control circuit 30b is similar to that of the multi-processor system 1a shown in FIG. 4, and thus the description will be omitted.

Figure 14:
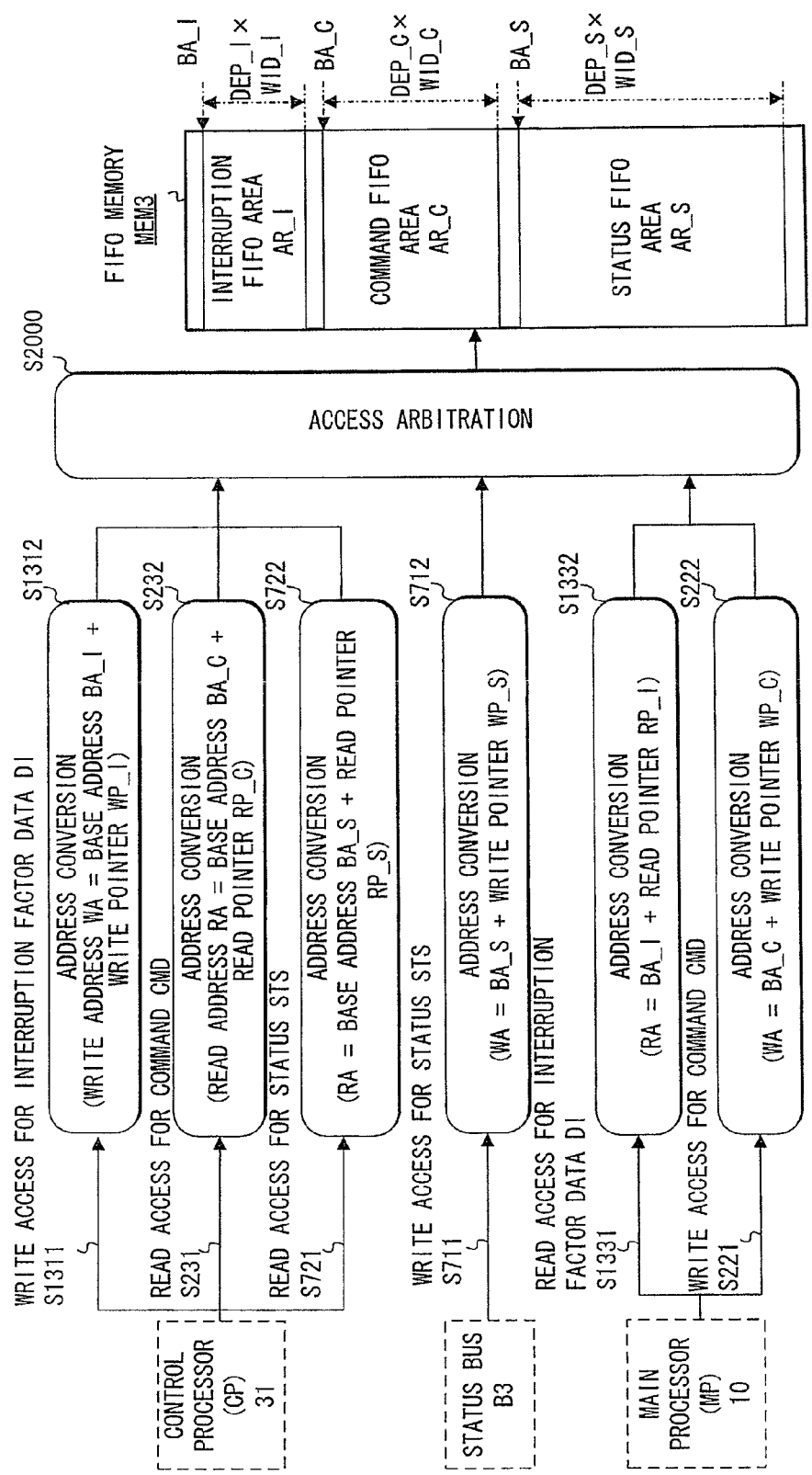
FIG. 14 is a diagram showing examples of a process to convert an address and a process to arbitrate access to data buses executed by the FIFO memory controller which is used in the second exemplary embodiment of the multi-processor system according to the present invention.

FIG. 14 shows an example of a process to convert the address and a process to arbitrate access to the data buses which are executed by the FIFO memory controller 35.

Firstly, the interruption FIFO area AR_I, the command FIFO area AR_C and the status FIFO area AR_S are formed on the address space in the FIFO memory MEM3. The base address and area length of the interruption FIFO area AR_I are set respectively to BA_I and "stage number DEP_I*data bit width WID_I". Similarly, the base address and area length of the command FIFO area AR_C are set respectively to BA_C and "stage number DEP_C*data bit width WID_C". The base address and area length of the status FIFO area AR_S are set respectively to BA_S and "stage number DEP_S*data bit width WID_S". Note that it is possible to vary the area length of each FIFO area by changing the setting values of the base address BA and the stage number DEP.

As shown in FIG. 14, when write access for the interruption factor data DI is generated by the control processor 31 (Step S1311), the address/data converter circuit 202_3 in the FIFO memory controller 35 adds a value of a write pointer WP_I of the interruption FIFO area AR_I received from the control interface 201 to the base address BA_I to generate a write address WA on the FIFO memory MEM3 (Step S1312). At this time, if access from the address/data converter circuit 202_3 to the data buses conflicts with access from at least one of the status bus B3 and the main processor 10 to the data buses, the arbiter circuit 203 performs access arbitration (Step S2000). Specifically, the arbiter circuit 203 performs the access arbitration in "round-robin fashion", "priority fashion in order of main processor 10>control processor 31>status bus B3" or the like.

Further, when read access for the sequence start command CMD22 is generated by the control processor 31 (Step S231), the address/data converter circuit 202_3 adds a value of a read pointer RP_C of the command FIFO area AR_C to the base address BA_C to generate a read address RA on the FIFO memory MEMS (Step S232). Similarly, when read access for the process status STS is generated by the control processor 31 (Step S721), the address/data converter circuit 202_3 adds a value of a read pointer RP_S of the status FIFO area AR_S to the base address BA_S to generate the read address RA (Step S722).

On the other hand, when write access for the process status STS from the status bus B3 is generated (Step S711), the address/data converter circuit 202_1 in the FIFO memory controller 35 adds a value of a write pointer WP_S of the status FIFO area AR_S to the base address BA_S to generate the write address WA (Step S712). Note that the process status STS is written in the status FIFO area AR_S, as it is in the format as shown in FIG. 8.

Further, when read access for the interruption factor data DI is generated by the main processor 10 (Step S1331), the address/data converter circuit 202_2 in the FIFO memory controller 35 adds a value of a read pointer RP_I of the interruption FIFO area AR_I to the base address BA_I to generate the read address RA (Step S1332). Similarly, when write access for the sequence start command CMD22 is generated (Step S221), the address/data converter circuit 202_2 adds a value of a write pointer WP_C of the command FIFO area AR_C to the base address BA_C to generate the write address WA (Step S222).

The arbiter circuit 203 also performs the access arbitration, when the write address WA or the read address RA is generated at any one of the above-mentioned Steps S232, S722, S712, S1332 and S222.

Note that although the illustration is omitted, the control processor 31 can also perform random access as with the normal memory access by directly designating the address value of the FIFO memory MEM3, for the sake of e.g. testing the memory.

Further, the FIFO memory controller 35 performs processes to convert the data shown in FIGS. 15A and 15B. For example, as shown in FIG. 15A, in a case where the data bit width WID_I of the interruption factor data DI equals to "8 bits", the data bus width equals to "32 bits", and write to the write address WA="0x040A" is performed, the address/data converter circuit 202_3 in the FIFO memory controller 35 transfers the interruption factor data DI to the FIFO memory MEM3 by using the data buses [23:16], thereby writing the interruption factor data DI in the 16th to 23rd bits in the area corresponding to the address "0x0408" on the FIFO memory MEM3.

On the other hand, in a case of reading the interruption factor data DI written by the above-mentioned process (that is, in a case of performing read from the read address RA="0x040A"), the address/data converter circuit 202_2 reads 8 bits of interruption factor data DI [7:0] from the FIFO memory MEM3 through the data buses [23:16].

Further, as shown in FIG. 15B, in a case where the data bit width WID_C of the process command CMD equals to "16 bits" and write to the write address WA="0x050A" is performed, the address/data converter circuit 202_2 transfers the process command CMD to the FIFO memory MEM3 by using the data buses [31:16], thereby writing the process command CMD in the 16th to 31st bits in the area corresponding to the address "0x0508" on the FIFO memory MEM3.

On the other hand, in a case of reading the process command CMD written by the above-mentioned process (that is, in a case of performing read from the read address RA="0x050A"), the address/data converter circuit 202_3 reads 16 bits of process command CMD [15:0] from the FIFO memory MEM3 through the data buses [31:16].

Figure 16:
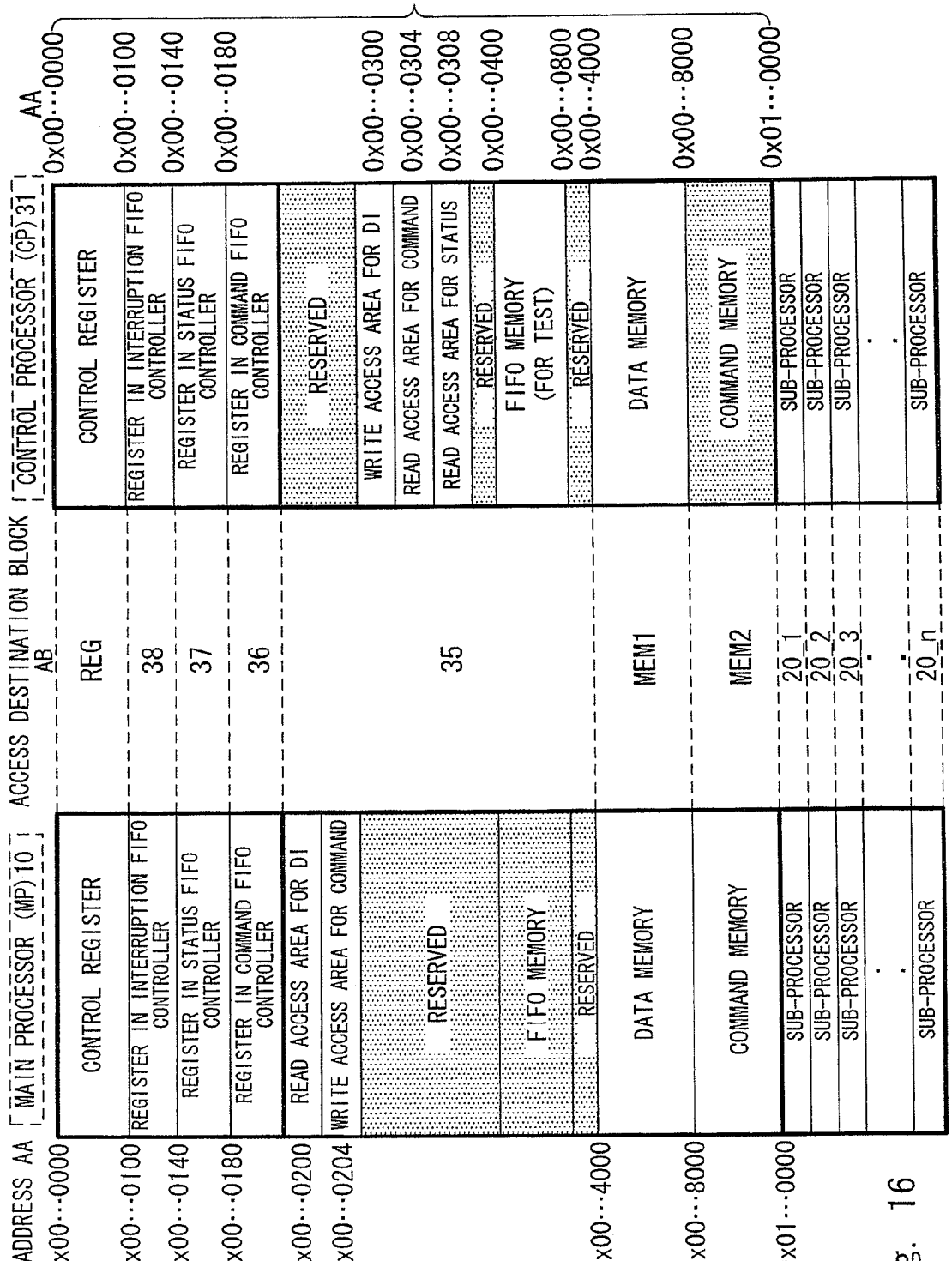
FIG. 16 is a diagram showing an example of address maps of an execution control circuit which is used in the second exemplary embodiment of the multi-processor system according to the present invention.

FIG. 16 shows an example of address maps of the execution control circuit 30b, which are viewed from the main processor 10 and the control processor 31. For example, regarding each of the FIFO managers 36 to 38, only access address AA of each of the management register 101, the mask register 102 and the clear register 103 shown in FIG. 13 is mapped. On the other hand, access addresses AA of FIFO areas (read access area for interruption factor data, write access area for command, write access area for interruption factor data, read access area for command, and read access area for status) are mapped on the address spaces of the FIFO memory controller 35. That is, for example, the control processor 31 sequentially accesses the access address AA="0x00 ... 0308" of the read access area for status, thereby actually being able to sequentially read process statuses STS from continuous addresses within the status FIFO area AR_S shown in FIG. 14.

In this way, the interruption FIFO area AR_I, the command FIFO area AR_C and the status FIFO area AR_S are formed on one memory. Therefore, it is possible to vary the number of stages of data stored in the FIFO area and the data bit width, so that it is possible to further improve extensibility of the multi-processor system compared with the above-mentioned first exemplary embodiment. Namely, it is possible to flexibly respond to the number or the format of process statuses, process commands or interruption factors being changed by specification change after the development of LSI or the like.

Next, the third exemplary embodiment is described with reference to FIGS. 17 to 19.

Third Exemplary Embodiment

Configuration Example

Figure 17:
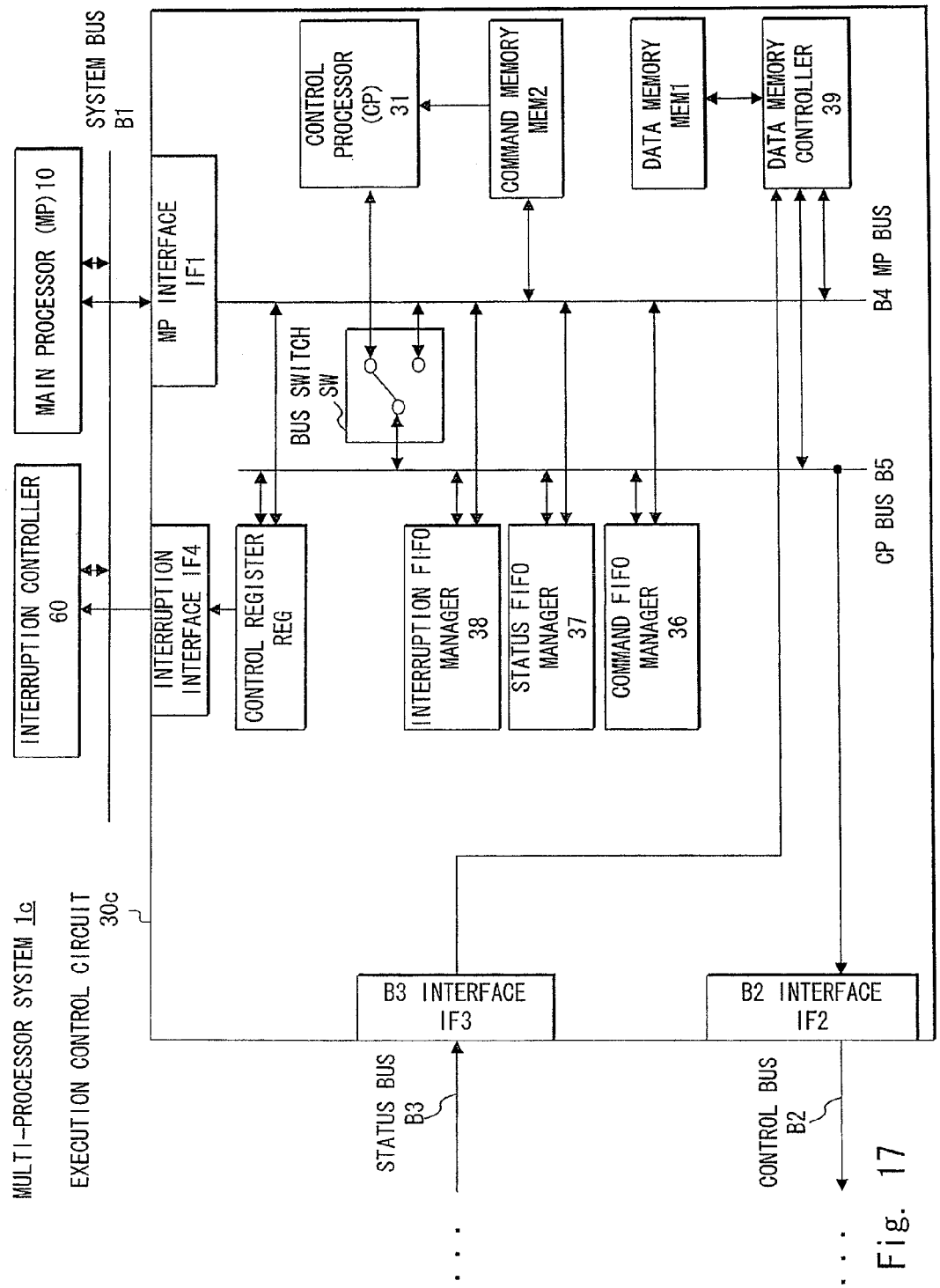
FIG. 17 is a block diagram showing a configuration example in a third exemplary embodiment of a multi-processor system according to the present invention.

As shown in FIG. 17, a multi-processor system 1c according to this exemplary embodiment is different from the above-mentioned second exemplary embodiment, in that an execution control circuit 3c includes a data memory controller 39 which controls access to the data memory MEM1, as substitute for the FIFO memory MEM3 and the FIFO memory controller 35 in the execution control circuit 30b shown in FIG. 12. That is, in this exemplary embodiment, the interruption FIFO area AR_I, the command FIFO area AR_C and the status FIFO area AR_S shown in the above-mentioned second exemplary embodiment are formed on the address space in the data memory MEM1. Further, the data memory controller 39 is connected to the MP bus B4 and the CP bus B5. The process status STS from the status bus B3 is input to the data memory controller 39 through the B3 interface IF3.

Note that although the illustration is omitted, the multi-processor system 1c includes "n" units of sub-processors 20_1 to 20_n and the arbiter circuit 40 which arbitrates transfer of the process command CMD and the process status STS between the sub-processors and the execution control circuit 30c, as with the multi-processor system 1a shown in FIG. 4.

Operation Example

Next, operation of this exemplary embodiment is described with reference to FIGS. 18 and 19. Note that operation which does not relate to access to the FIFO area in the execution control circuit 30c is similar to that of the multi-processor system 1a shown in FIG. 4, and thus the description will be omitted.

Figure 18:
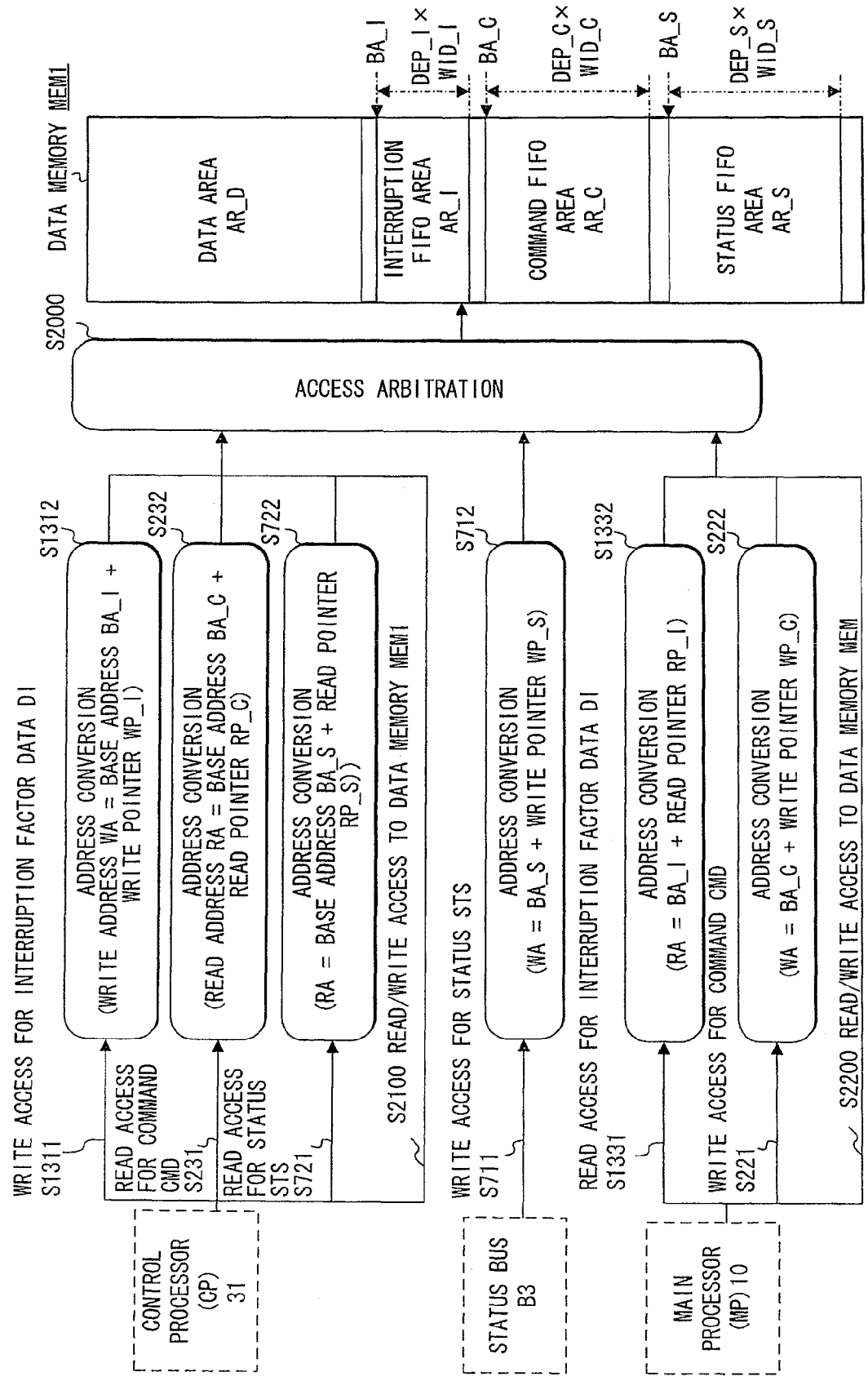
FIG. 18 is a diagram showing examples of a process to convert an address and a process to arbitrate access to data buses executed by a data memory controller which is used in the third exemplary embodiment of the multi-processor system according to the present invention.

FIG. 18 shows an example of a process to convert the address and a process to arbitrate access to the data buses which are executed by the data memory controller 39. This example is different from the example of the process to convert the address and the process to arbitrate the access to the data buses shown in FIG. 14, in that the control processor 31 and the main processor 10 can execute respective processes at Steps S2100 and S2200. In other words, when the FIFO areas AR_I, AR_C and AR_S are formed in the data memory MEM1, the control processor 31 and the main processor 10 can perform access to each FIFO area and random access to a data area AR_D by using a single data memory MEM1.

Figure 19:
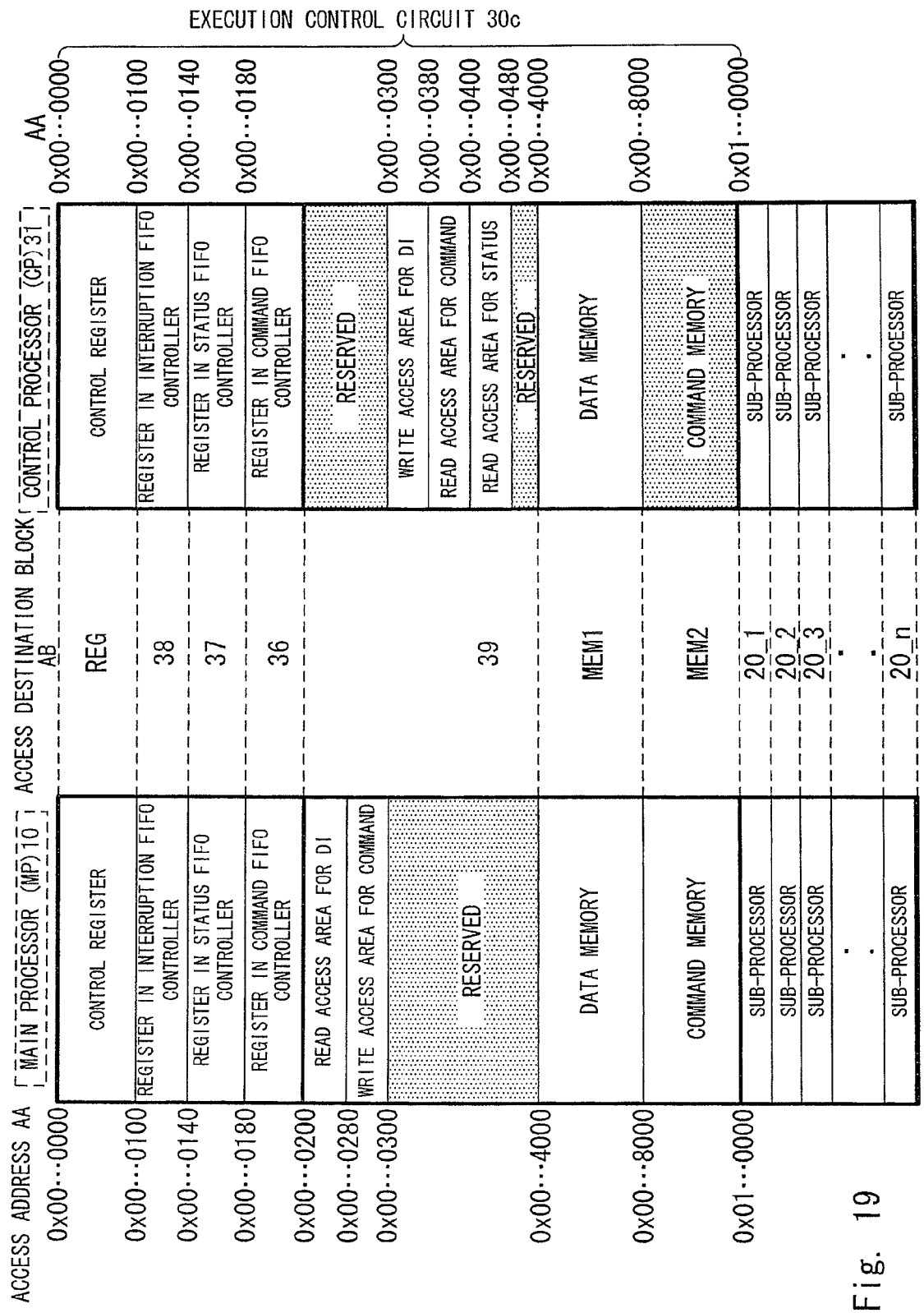
FIG. 19 is a diagram showing an example of address maps of an execution control circuit which is used in the third exemplary embodiment of the multi-processor system according to the present invention.

FIG. 19 shows an example of address maps of the execution control circuit 30c, which are viewed from the main processor 10 and the control processor 31. These address maps are different from those of the execution control circuit 30b shown in FIG. 16, in that the access addresses AA for the FIFO areas are allocated to the respective FIFO areas not one by one but by two or more, so as to include at least the top and end of each of the FIFO areas. That is, in this exemplary embodiment, each of the FIFO areas is mapped as an address space with a certain area width.

Accordingly, when any address is accessed within the mapped address space, it means access to the same FIFO (sequential access to data in the FIFO area). On the other hand, the main processor 10 and the control processor 31 can also perform incremental burst access (burst access to continuous data in the FIFO area) by using a plurality of access addresses. In this case, it is possible to speed up the access processing for the FIFO.

Next, the fourth exemplary embodiment is described with reference to FIG. 20.

Fourth Exemplary Embodiment

Figure 20:
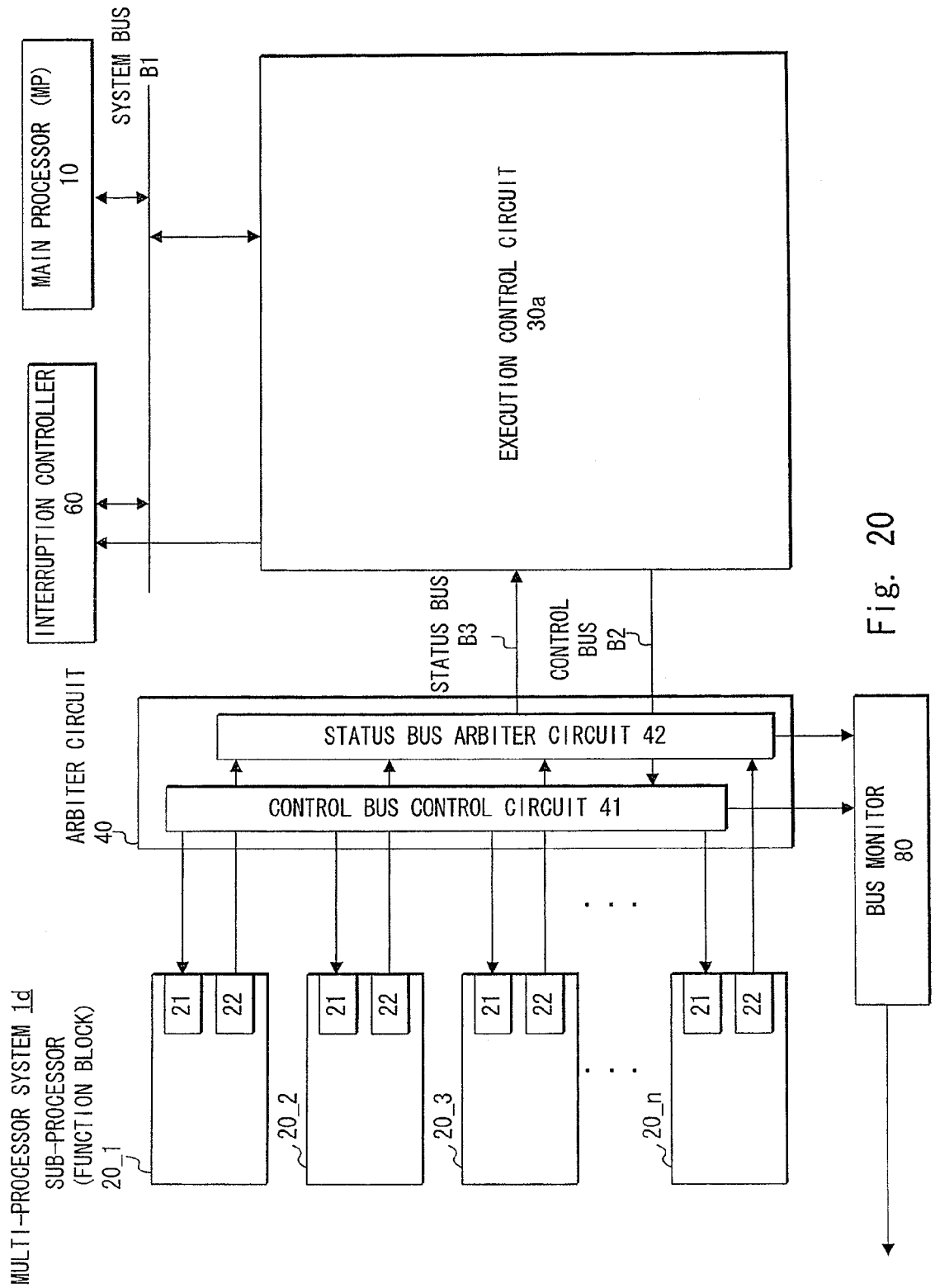
FIG. 20 is a block diagram showing a configuration example in a fourth exemplary embodiment of a multi-processor system according to the present invention.

As shown in FIG. 20, a multi-processor system 1d according to this exemplary embodiment includes a bus monitor 80 which monitors and externally outputs the process command CMD and the process status STS passing respectively through the bus control circuit 41 and the status bus arbiter circuit 42 in the arbiter circuit 40, in addition to the configuration of the multi-processor system 1a shown in FIG. 4. Note that the bus monitor 80 may be provided in the multi-processor systems 1b and 1c respectively shown in FIGS. 12 and 17. The following description can be applied also to this case. Further, in a case of conducting communication between sub-processors by use of a shared memory as the above-mentioned second example of the application, observation of the communication may be performed by connecting the bus monitor 80 to a bus for the shared memory.

In operation, the bus monitor 80 monitors and externally outputs commands from the execution control circuit 30a to the sub-processors 20_1 to 20_n, which request the start of processing and the like, and the process completion notification, an error notification and the like from the sub-processors 20_1 to 20_n to the execution control circuit 30a. Therefore, it is possible to observe almost all operating statuses regarding the process execution by each sub-processor. The reason why high observability (debuggability) can be assured in this way is because all communication between the execution control circuit 30a and the sub-processors 20_1 to 20_n is conducted through the shared bus without using exclusive lines or buses for the transfer of the process status STS.

Next, the fifth exemplary embodiment is described with reference to FIG. 21.

Fifth Exemplary Embodiment

Figure 21:
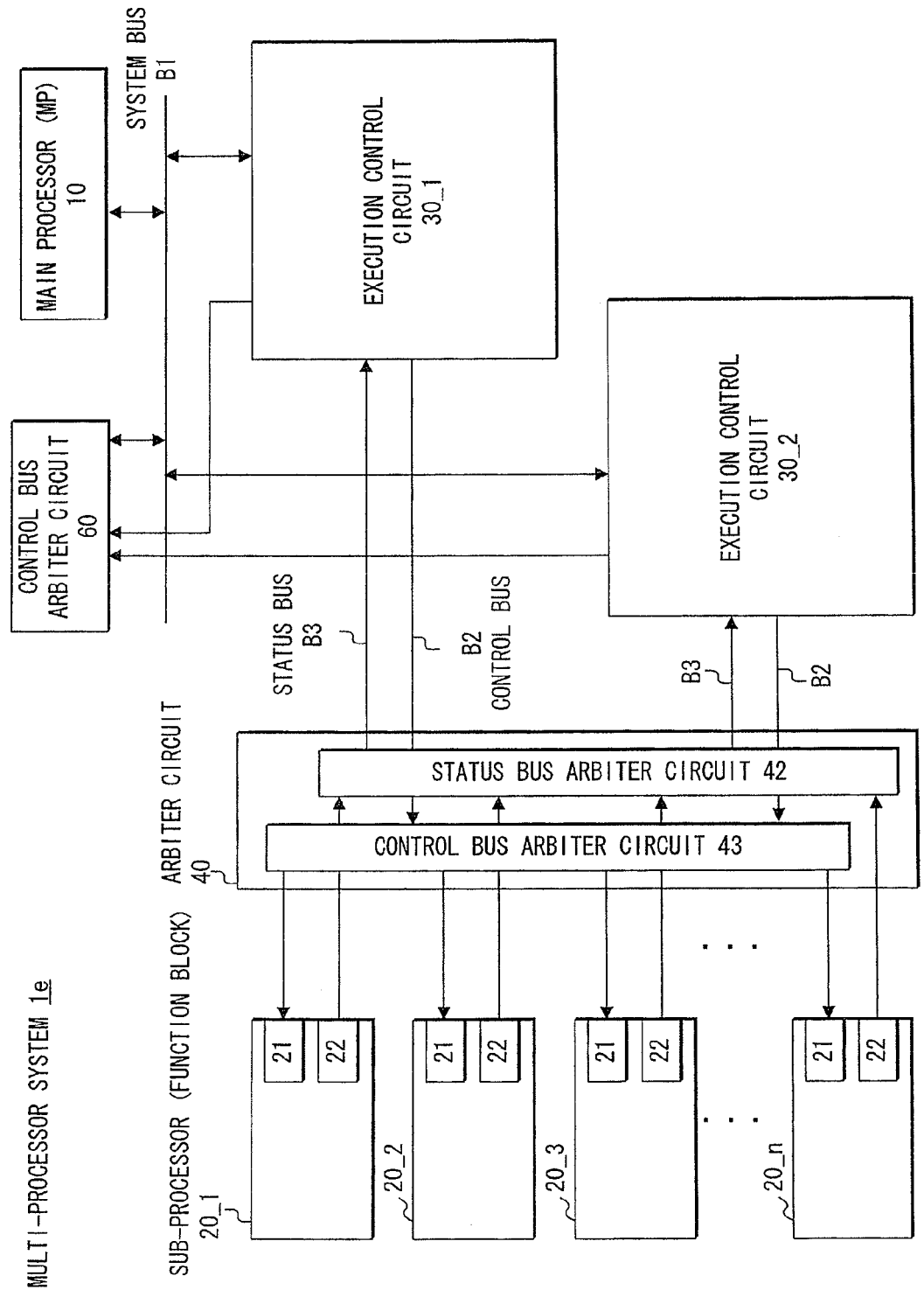
FIG. 21 is a block diagram showing a configuration example in a fifth exemplary embodiment of a multi-processor system according to the present invention.
Figure 22:
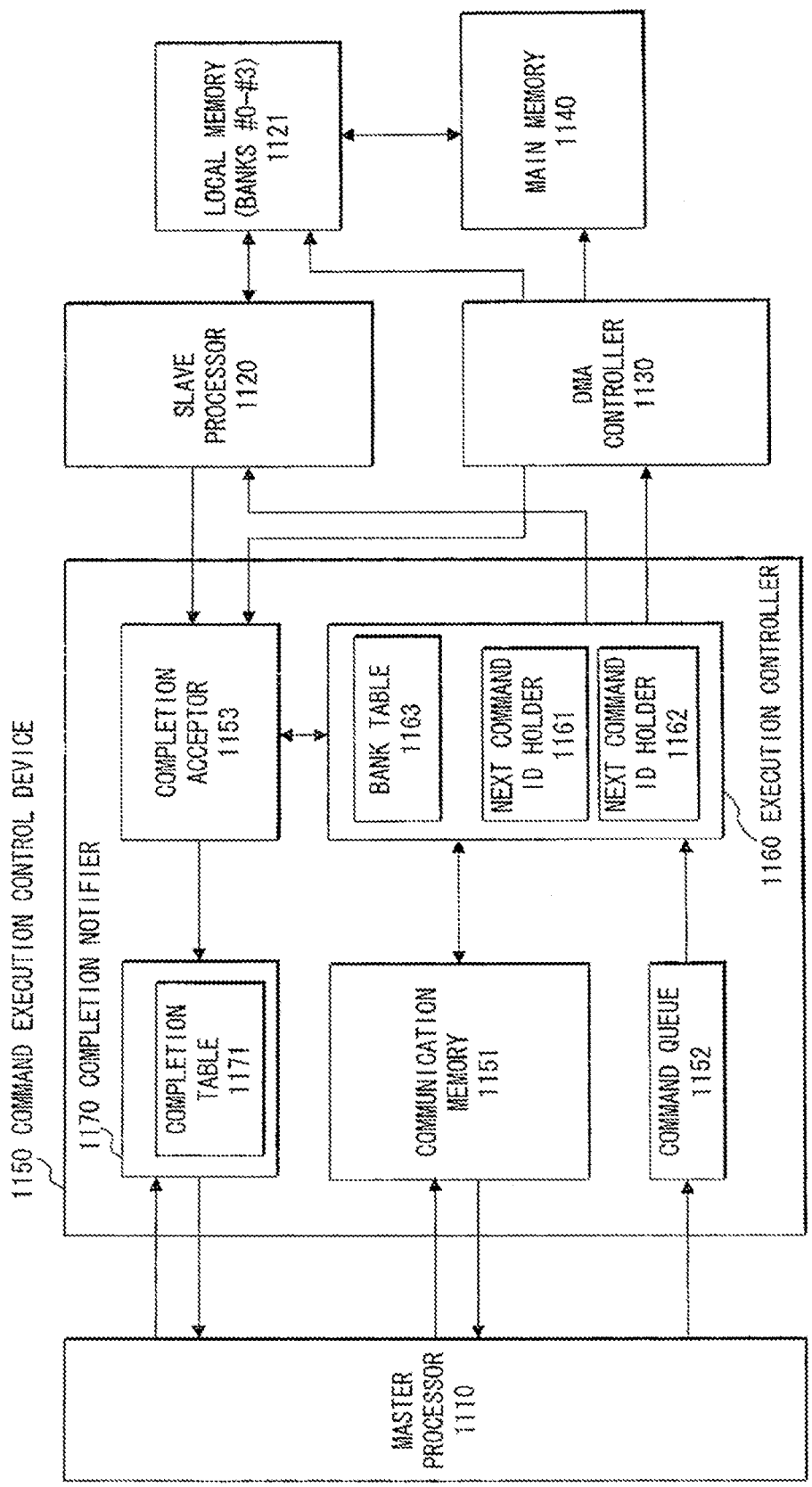
FIG. 22 is a block diagram showing a configuration example of a multi-processor system according to first related art of the present invention.
Figure 23:
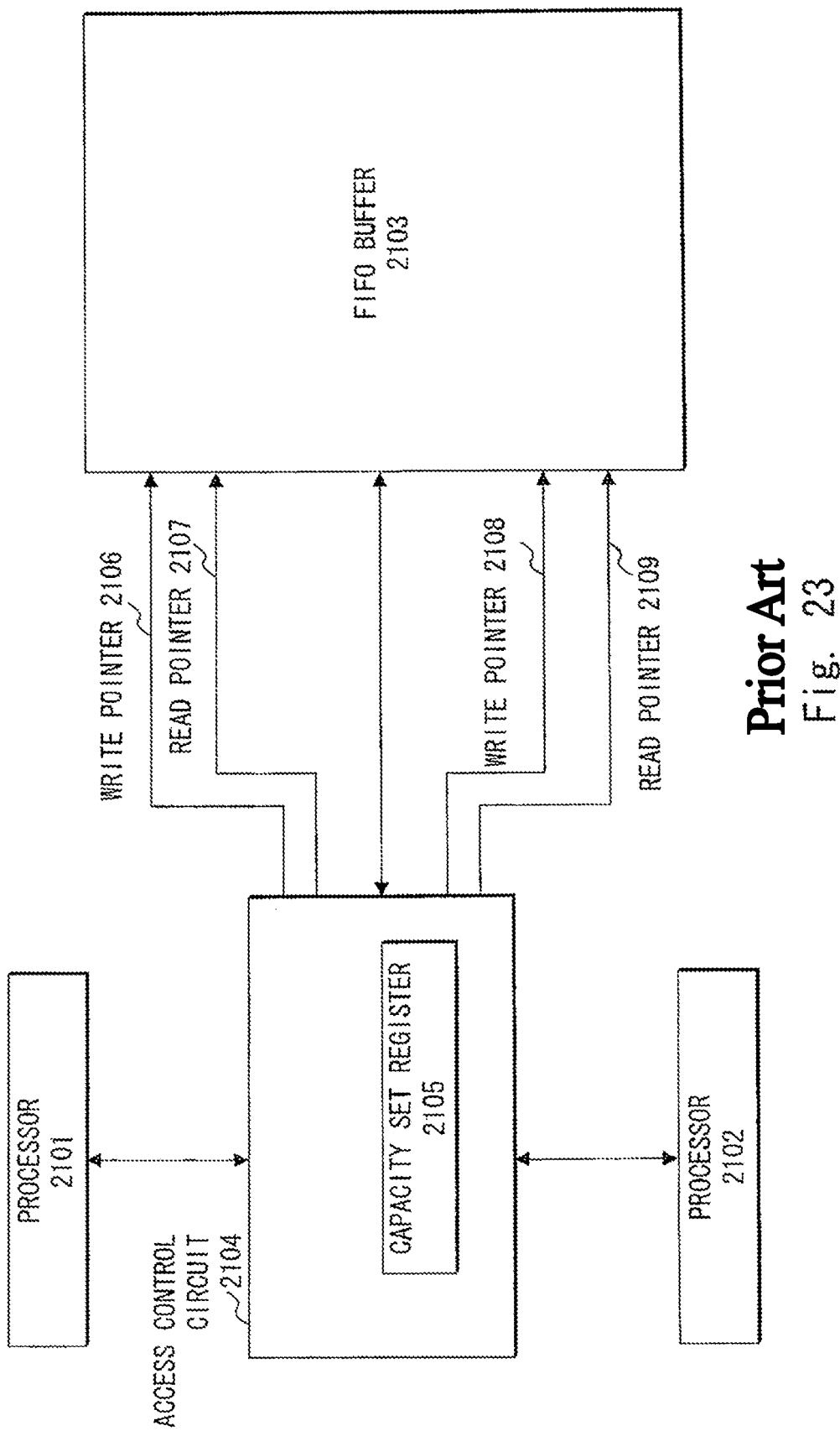
FIG. 23 is a block diagram showing a configuration example of a multi-processor system according to third related art of the present invention.

As shown in FIG. 21, a multi-processor system 1e according to this exemplary embodiment includes two units of execution control circuits 30_1 and 30_2. Further, the arbiter circuit 40 includes a control bus arbiter circuit 43 which arbitrates access from the execution control circuits 30_1 and 30_2 to the control bus B2 upon transfer of the process command CMD, as substitute for the control bus control circuit 41 shown in e.g. FIG. 4. Note that the arbiter circuit may be provided for each execution control circuit. Three or more execution control circuits may be provided. Further, a plurality of main processors may be provided. Furthermore, as each of the execution control circuits 30_1 and 30_2, any one of the execution control circuit 30a shown in FIG. 4, the execution control circuit 30b shown in FIG. 12 and the execution control circuit 30c shown in FIG. 17 may be used.

In operation, the main processor 10 sets mutually different process sequences in the execution control circuits 30_1 and 30_2, thereby making the execution control circuits 30_1 and 30_2 perform the execution control in parallel. Further, when access from the execution control circuits 30_1 and 30_2 to the control bus B2 conflicts, the control bus arbiter circuit 43 performs address decoding after performing access arbitration in round-robin fashion or the like, and transfers a process command from the selected execution control circuit to the sub-processor. Similarly, the status bus arbiter circuit 42 performs the access arbitration in the case where access from the sub-processors 20_1 to 20_n to the status bus B3 conflicts.

Thus, it is possible to enhance further load distribution as a whole system. Further, since processing load of the whole system is reduced, it is also possible to increase the number of sub-processors. Furthermore, processing load associated with the execution control can be reduced by implementing a plurality of execution control circuits, even when the number of sub-processors rapidly increases with the growing scale of the system. Therefore, it is possible to prevent the processing in the whole system from collapsing. Note that even in a case of adding the execution control circuit, it is not necessary for the circuit configuration thereof to be changed.

Note that the present invention is not limited to the above-mentioned exemplary embodiments, and it is obvious that various modifications can be made by those of ordinary skill in the art based on the recitation of the claims.

This application is based upon and claims the benefit of priority from Japanese patent application No. 2008-203768, filed on Aug. 7, 2008, the disclosure of which is incorporated herein in its entirety by reference.

INDUSTRIAL APPLICABILITY

The present invention is applicable to a multi-processor system and a controlling method thereof, and particularly to a multi-processor system which controls a plurality of sub-processors in parallel and a controlling method thereof.

REFERENCE SIGNS LIST 1, 1a-1e MULTI-PROCESSOR SYSTEM
2 DATA PROCESSING SYSTEM
3 CODEC SYSTEM
10 MAIN PROCESSOR (MP)
20_1-20_n SUB-PROCESSOR (FUNCTION BLOCK)
21 Command Reception Controller 22 STATUS NOTIFICATION CONTROLLER
23_1, 23_6 DATA TRANSMITTING FUNCTION BLOCK
23_2 DATA RECEIVING FUNCTION BLOCK
23_3 TIMING FUNCTION BLOCK
23_4, 23_5 DATA PROCESSING FUNCTION BLOCK
24_1 TRANSCEIVING FUNCTION BLOCK
24_2-24_4 DECODE FUNCTION BLOCK
24_5-24_6 ENCODE FUNCTION BLOCK
30, 30a-30c, 30_1-30_2 EXECUTION CONTROL CIRCUIT
31 CONTROL PROCESSOR (CP)
32 COMMAND FIFO
33 STATUS FIFO
34 INTERRUPTION FIFO
35 FIFO MEMORY CONTROLLER
36 COMMAND FIFO MANAGER
37 STATUS FIFO MANAGER
38 INTERRUPTION FIFO MANAGER
39 DATA MEMORY CONTROLLER
40 ARBITER CIRCUIT
41 CONTROL BUS CONTROL CIRCUIT
42 STATUS BUS ARBITER CIRCUIT
43 CONTROL BUS ARBITER CIRCUIT
50 SHARED MEMORY
60 INTERRUPTION CONTROLLER
70 MEMORY CONTROLLER
80 BUS MONITOR
101 MANAGEMENT REGISTER
102 MASK REGISTER
103 CLEAR REGISTER
104 MASK CIRCUIT
AA ACCESS ADDRESS
AB ACCESS DESTINATION BLOCK
AR_C COMMAND FIFO AREA
AR_D DATA AREA
AR_I INTERRUPTION FIFO AREA
AR_S STATUS FIFO AREA
B1 SYSTEM BUS
B2 CONTROL BUS
B3 STATUS BUS
B4 MP BUS
B5 CP BUS
BA, BA_I, BA_S, BA_C BASE ADDRESS
CMD, CMD1, CMD2, CMD22 PROCESS COMMAND
D0-D3 DATA
Dd DECODED DATA
De ENCODED DATA
DEP, DEP_I, DEP_S, DEP_C STAGE NUMBER
Df PROCESSED DATA
DI INTERRUPTION FACTOR DATA
Din RECEIVED DATA
Dout TRANSMITTED DATA
FLG STATUS FLAG
IF1 MP INTERFACE
IF2 B2 INTERFACE
IF3 B3 INTERFACE
IF4 INTERRUPTION INTERFACE
INS INSTRUCTION CODE
MEM1 DATA MEMORY
MEM2 COMMAND MEMORY
MEM3 FIFO MEMORY
NTF PROCESS COMPLETION NOTIFICATION
NUM STORED DATA NUMBER
PA-PD PROCESS
RA READ ADDRESS
RE READ ENABLE SIGNAL
REG CONTROL REGISTER
RP, RP_I, RP_S, RP_C READ POINTER
SEQ PROCESS SEQUENCE
SI INTERRUPTION SIGNAL
STS, STS1, STS2 PROCESS STATUS
SW BUS SWITCH
WA WRITE ADDRESS
WE WRITE ENABLE SIGNAL
WID, WID_I, WID_S, WID_C DATA BIT WIDTH
WP, WP_I, WP_S, WP_C WRITE POINTER

The invention claimed is:

1. A multi-processor system comprising:
at least one main processor;
a plurality of sub-processors;
an execution control unit that issues a process command to each of the sub-processors based on a process sequence designated by the main processor, and acquires an execution result of processing executed by each of the sub-processors in accordance with the process command; and
an arbiter unit that arbitrates transfer of the process command and the execution result between the execution control unit and each of the sub-processors,
wherein the arbiter unit includes:
a control bus control unit that controls a control bus for transferring the process command from the execution control unit to each of the sub-processors; and
a status bus arbiter unit that arbitrates access to a status bus for transferring the execution result from each of the sub-processors to the execution control unit,
wherein the execution control unit includes:
a memory in which a command FIFO area storing a command from the main processor, a status FIFO area storing the execution result, and an interruption FIFO area storing content of an interruption notification to the main processor are formed on the same address space; and
an address generation unit that generates an address on the memory for accessing desired data in each of the FIFO areas, based on a base address of each of the FIFO areas and the number of stages of data capable of being stored in each of the FIFO areas.

2. The multi-processor system according to claim 1, wherein each of the sub-processors includes:
a command reception control unit that receives the process command from the control bus; and
a status notification control unit that transmits the execution result to the status bus.

3. The multi-processor system according to claim 1, wherein the process command includes a process ID for designating the processing, and
the execution result includes the process ID and a status of the processing.

4. The multi-processor system according to claim 1, wherein the arbiter unit adds a sub-processor ID indicating a transfer source of the execution result thereto to be transferred to the execution control unit, and
the execution control unit stores in the status FIFO area the sub-processor ID in association with the execution result.

5. The multi-processor system according to claim 1, wherein the address generation unit generates the address on the memory in accordance with each of data bit widths of the command from the main processor, the execution result, and the content of the interruption notification, and
the execution control unit further includes a data bus determination unit that determines data buses to be used for accessing each of the command from the main processor, the execution result, and the content of the interruption notification among parallel data buses connected to the memory, based on a difference between each of the data bit widths and a data bit width of the memory.

6. The multi-processor system according to claim 1, wherein each of the FIFO areas is formed in a data memory used by a control processor implemented in the execution control unit.

7. The multi-processor system according to claim 1, wherein access addresses for causing the main processor or a control processor implemented in the execution control unit to continuously access plural pieces of data are allocated to each of the FIFO areas.

8. The multi-processor system according to claim 1, further comprising a multi-banked shared memory,
wherein through the shared memory, each of the sub-processors acquires input data required for the processing and outputs data obtained by the processing.

9. The multi-processor system according to claim 1, further comprising a monitor unit that monitors and externally outputs the process command and the execution result passing through the arbiter unit.

10. A multi-processor system comprising:
at least one main processor;
a plurality of sub-processors;
a plurality of execution control units each of which issues a process command to each of the sub-processors based on a process sequence designated by the main processor, and acquires an execution result of processing executed by each of the sub-processors in accordance with the process command; and
an arbiter unit that arbitrates transfer of the process command and the execution result between each of the execution control units and each of the sub-processors,
wherein the arbiter unit includes:
a control bus arbiter unit that arbitrates access to a control bus for transferring the process command from each of the execution control units to each of the sub-processors; and
a status bus arbiter unit that arbitrates access to a status bus for transferring the execution result from each of the sub-processors to each of the execution control units,
wherein each of the execution control units includes:
a memory in which a command FIFO area storing a command from the main processor, a status FIFO area storing the execution result, and an interruption FIFO area storing content of an interruption notification to the main processor are formed on the same address space; and
an address generation unit that generates an address on the memory for accessing desired data in each of the FIFO areas, based on a base address of each of the FIFO areas and the number of stages of data capable of being stored in each of the FIFO areas.

11. A method of controlling a multi-processor system that includes at least one main processor and a plurality of sub-processors, the method comprising:
issuing, by an execution control circuit, a process command to each of the sub-processors based on a process sequence designated by the main processor, and acquiring, by the execution control circuit, an execution result of processing executed by each of the sub-processors in accordance with the process command;
arbitrating, by an arbiter circuit that is provided between the execution control circuit and each of the sub-processors, transfer of the process command to each of the sub-processors, and transfer of the execution result to the main processor;
performing, by the execution control circuit, when a plurality of process sequences are designated by the main processor, the issue of the process command and the acquisition of the execution result in parallel for each process sequence;
using, by the execution control circuit, a memory in which a command FIFO area storing a command from the main processor, a status FIFO area storing the execution result, and an interruption FIFO area storing content of an interruption notification to the main processor are formed on the same address space; and
generating, by the execution control circuit, an address on the memory for accessing desired data in each of the FIFO areas, based on a base address of each of the FIFO areas and the number of stages of data capable of being stored in each of the FIFO areas.

12. The method according to claim 11, wherein a process ID for designating the processing is included in the process command, and
the process ID and a status of the processing are included in the execution result.

13. The method according to claim 11, wherein the process command and execution result arbitrated by the arbiter circuit are monitored and externally output.

* * * * *